(12) United States Patent
Hosseini et al.

(10) Patent No.: US 11,343,743 B2
(45) Date of Patent: May 24, 2022

(54) HANDOVER TECHNIQUES TO PROVIDE SERVICE CONTINUITY WITH MULTIPLE CONCURRENT CONNECTIONS

(71) Applicant: QUALCOMM Incorporated, San Diego, CA (US)

(72) Inventors: Seyedkianoush Hosseini, San Diego, CA (US); Hung Dinh Ly, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/950,354

(22) Filed: Nov. 17, 2020

(65) Prior Publication Data

US 2021/0153091 A1 May 20, 2021

Related U.S. Application Data

(60) Provisional application No. 62/937,220, filed on Nov. 18, 2019.

(51) Int. Cl.
*H04W 36/16* (2009.01)
*H04W 76/15* (2018.01)
(Continued)

(52) U.S. Cl.
CPC ....... *H04W 36/16* (2013.01); *H04W 36/0069* (2018.08); *H04W 36/08* (2013.01); *H04W 76/15* (2018.02); *H04W 88/06* (2013.01)

(58) Field of Classification Search
CPC . H04W 36/16; H04W 36/0069; H04W 36/08; H04W 76/15; H04W 88/06; H04W 36/18
See application file for complete search history.

(56) References Cited

U.S. PATENT DOCUMENTS

| 2021/0105678 A1* | 4/2021 | Awoniyi-Oteri ...... H04W 36/18 |
| 2021/0105797 A1* | 4/2021 | Awoniyi-Oteri ........................... |
| | | H04W 72/1242 |
| 2021/0136829 A1* | 5/2021 | Kim ................. H04W 74/0833 |

OTHER PUBLICATIONS

Apple Inc: "On Remaining Issues on NR Mobility Enhancements," 3GPP Draft, 3GPP TSG RAN WG1 #100 bis, R1-2002344, 3rd Generation Partnership Project (3GPP), Mobile Competence Centre, 650, Route Des Lucioles, F-06921, Sophia-Antipolis Cedex, France, vol. RAN WG1, No. e-Meeting, Apr. 20, 2020-Apr. 30, 2020, Apr. 11, 2020 (Apr. 11, 2020), XP051875561, 3 pages , Retrieved from the Internet: URL:https://ftp.3gpp.org/tsg_ran/WG1_RL1/TSGR1_100b_e/Docs/R1-2002344.zip [retrieved on Apr. 11, 2020].

(Continued)

*Primary Examiner* — Magdi Elhag
(74) *Attorney, Agent, or Firm* — Holland & Hart LLP

(57) ABSTRACT

Methods, systems, and devices for wireless communications are described for service continuity in make-before-break handover procedures. A user equipment (UE) may receive grants for two or more concurrent communications with a source base station and a target base station during the handover procedure, where the UE may be incapable of performing the two or more concurrent communications. The UE may use one or more priority rules to determine communication priority. The one or more priority rules identify one or more channel types that have a higher priority than other channel types, may identify whether communications with the source base station or the target base station have priority, among other examples.

30 Claims, 15 Drawing Sheets

(51) Int. Cl.
  *H04W 36/08* (2009.01)
  *H04W 36/00* (2009.01)
  *H04W 88/06* (2009.01)

(56) References Cited

OTHER PUBLICATIONS

Intel Corporation: "Summary of Offline Discussion on Physical Layer Aspects of NR Mobility Enhancement," 3GPP Draft, 3GPP TSG RAN WG1 Meeting #98bis, R1-1911538, Intel NR E-Mobilty Offline Discussion Summary, 3rd Generation Partnership Project (3GPP), Mobile Competence Centre, 650, Route Des Lucioles, F-06921, Sophia-Antipolis Cedex, France, vol. RAN WG1, No. Chongqing, China, Aug. 14, 2019-Aug. 20, 2019, Oct. 22, 2019 (Oct. 22, 2019), XP051798802, 12 pages, Retrieved from the Internet: URL:https://ftp.3gpp.org/tsg_ran/WG1_RL1/TSGR1_98b/Docs/R1-1911538.zip [retrieved on Oct. 22, 2019] pp. 1, 3, 11.
International Search Report and Written Opinion—PCT/US2020/061094—ISA/EPO—dated Mar. 1, 2021.
QUALCOMM Inc: "Email Discussion Report for [107#79] [LTE/feMOB] Capability Coordination for RUDI HO," 3GPP Draft, 3GPP TSG-RAN WG2 Meeting #107bis, R2-1912821 [107#79] [LTE_FEMOB] Email Discussion Summary of Capability COORD for RUDI HO_V02, 3rd Generation Partnership Project (3GPP), Mobile Competence Centre, 650, Route Des Lucioles, F-06921, Sophia-Antipolis Cedex, France, vol. RAN WG2, No. Chongqing, China, Oct. 14, 2019-Oct. 18, 2019, Oct. 4, 2019 (Oct. 4, 2019), XP051804649, 27 pages, Retrieved from the Internet: URL:https://ftp.3gpp.org/tsg_ran/WG2_RL2/TSGR2_107bis/Docs/R2-1912821.zip [retrieved on Oct. 4, 2019].
QUALCOMM Incorporated: "Support Tx Sharing During DAPS HO," 3GPP Draft, 3GPP TSG-RAN WG2 Meeting #107bis, R2-1912300, 3rd Generation Partnership Project (3GPP), Mobile Competence Centre, 650, Route Des Lucioles, F-06921, Sophia-Antipolis Cedex, France, vol. RAN WG2, No. Chongqing, CN; Oct. 14,2019-Oct. 18, 2019, Oct. 4, 2019 (Oct. 4, 2019), XP051804382, 4 pages ,Retrieved from the Internet: URL:https://ftp.3gpp.org/tsg_ran/WG2_RL2/TSGR2_107bis/Docs/R2-1912300.zip—[retrieved on Oct. 4, 2019] p. 2-p. 3; figure 1.

* cited by examiner

HANDOVER TECHNIQUES TO PROVIDE SERVICE CONTINUITY WITH MULTIPLE CONCURRENT CONNECTIONS

CROSS REFERENCE

The present application for patent claims the benefit of U.S. Provisional Patent Application No. 62/937,220 by Hosseini et al., entitled "HANDOVER TECHNIQUES TO PROVIDE SERVICE CONTINUITY WITH MULTIPLE CONCURRENT CONNECTIONS," filed Nov. 18, 2019, assigned to the assignee hereof, and expressly incorporated by reference in its entirety herein.

BACKGROUND

The following relates generally to wireless communications, and more specifically to handover techniques to provide service continuity with multiple concurrent connections.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may support communications with a source base station and a target base station during a handover procedure from the source base station to the target base station. Some techniques, such as make-before-break handovers, may allow a UE to maintain communication links with both the source base station and the target base station until after handover is complete, with the decision to release the communication link(s) (e.g., cease communicating with) the source base station made following establishment of the connection with the target base station. Such techniques, however, may lead to discontinuity in some services if concurrent communications with different base stations are scheduled for a UE that does not support such concurrent communications.

SUMMARY

The described techniques relate to improved methods, systems, devices, and apparatuses that support handover techniques to provide service continuity with multiple concurrent connections. According to various aspects, a user equipment (UE) may use one or more priority rules for determining communication priority during a handover when concurrent connections with a source base station and a target base station are maintained. In some cases, a UE may establish a first connection with a source base station, and then initiate a handover procedure and establish a second connection with a target base station, where both the first connection and the second connection are active for at least a portion of the handover procedure. Further, in some cases, the UE may be incapable of simultaneously communicating on both the first connection and the second connection. In various aspects, one or more priority rules may be used by such UEs to determine which communications to transmit or receive. In some cases, the one or more priority rules may be established to provide enhanced service continuity for one or more higher priority or lower latency channels relative to other channels with lower priority or more relaxed latency targets.

A method of wireless communication at a UE is described. The method may include establishing, while connected with a source base station via a first connection, a second connection with a target base station responsive to initiating a handover procedure from the source base station to the target base station, where both the first connection and the second connection are active for at least a portion of the handover procedure, identifying a first transmission of the source base station that at least partially overlaps in time with a second transmission of the target base station while both the first connection and the second connection are active, determining which of the first transmission or the second transmission is a higher priority transmission, and processing the higher priority transmission based on the determining.

An apparatus for wireless communication at a UE is described. The apparatus may include a processor, memory coupled with the processor, and instructions stored in the memory. The instructions may be executable by the processor to cause the apparatus to establish, while connected with a source base station via a first connection, a second connection with a target base station responsive to initiating a handover procedure from the source base station to the target base station, where both the first connection and the second connection are active for at least a portion of the handover procedure, identify a first transmission of the source base station that at least partially overlaps in time with a second transmission of the target base station while both the first connection and the second connection are active, determine which of the first transmission or the second transmission is a higher priority transmission, and process the higher priority transmission based on the determining.

Another apparatus for wireless communication at a UE is described. The apparatus may include means for establishing, while connected with a source base station via a first connection, a second connection with a target base station responsive to initiating a handover procedure from the source base station to the target base station, where both the first connection and the second connection are active for at least a portion of the handover procedure, identifying a first transmission of the source base station that at least partially overlaps in time with a second transmission of the target base station while both the first connection and the second connection are active, determining which of the first transmission or the second transmission is a higher priority transmission, and processing the higher priority transmission based on the determining.

A non-transitory computer-readable medium storing code for wireless communication at a UE is described. The code may include instructions executable by a processor to establish, while connected with a source base station via a first connection, a second connection with a target base station responsive to initiating a handover procedure from the source base station to the target base station, where both the first connection and the second connection are active for at least a portion of the handover procedure, identify a first transmission of the source base station that at least partially overlaps in time with a second transmission of the target base station while both the first connection and the second connection are active, determine which of the first transmission or the second transmission is a higher priority transmission, and process the higher priority transmission based on the determining.

A method of wireless communication at a base station is described. The method may include transmitting, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station, initiating the handover procedure with the UE to handover the UE from the source base station to the target base station, and communicating with the UE during the handover procedure based on the priority information.

An apparatus for wireless communication at a base station is described. The apparatus may include a processor, memory coupled with the processor, and instructions stored in the memory. The instructions may be executable by the processor to cause the apparatus to transmit, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station, initiate the handover procedure with the UE to handover the UE from the source base station to the target base station, and communicate with the UE during the handover procedure based on the priority information.

Another apparatus for wireless communication at a base station is described. The apparatus may include means for transmitting, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station, initiating the handover procedure with the UE to handover the UE from the source base station to the target base station, and communicating with the UE during the handover procedure based on the priority information.

A non-transitory computer-readable medium storing code for wireless communication at a base station is described. The code may include instructions executable by a processor to transmit, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station, initiate the handover procedure with the UE to handover the UE from the source base station to the target base station, and communicate with the UE during the handover procedure based on the priority information.

DETAILED DESCRIPTION

Figure 1:
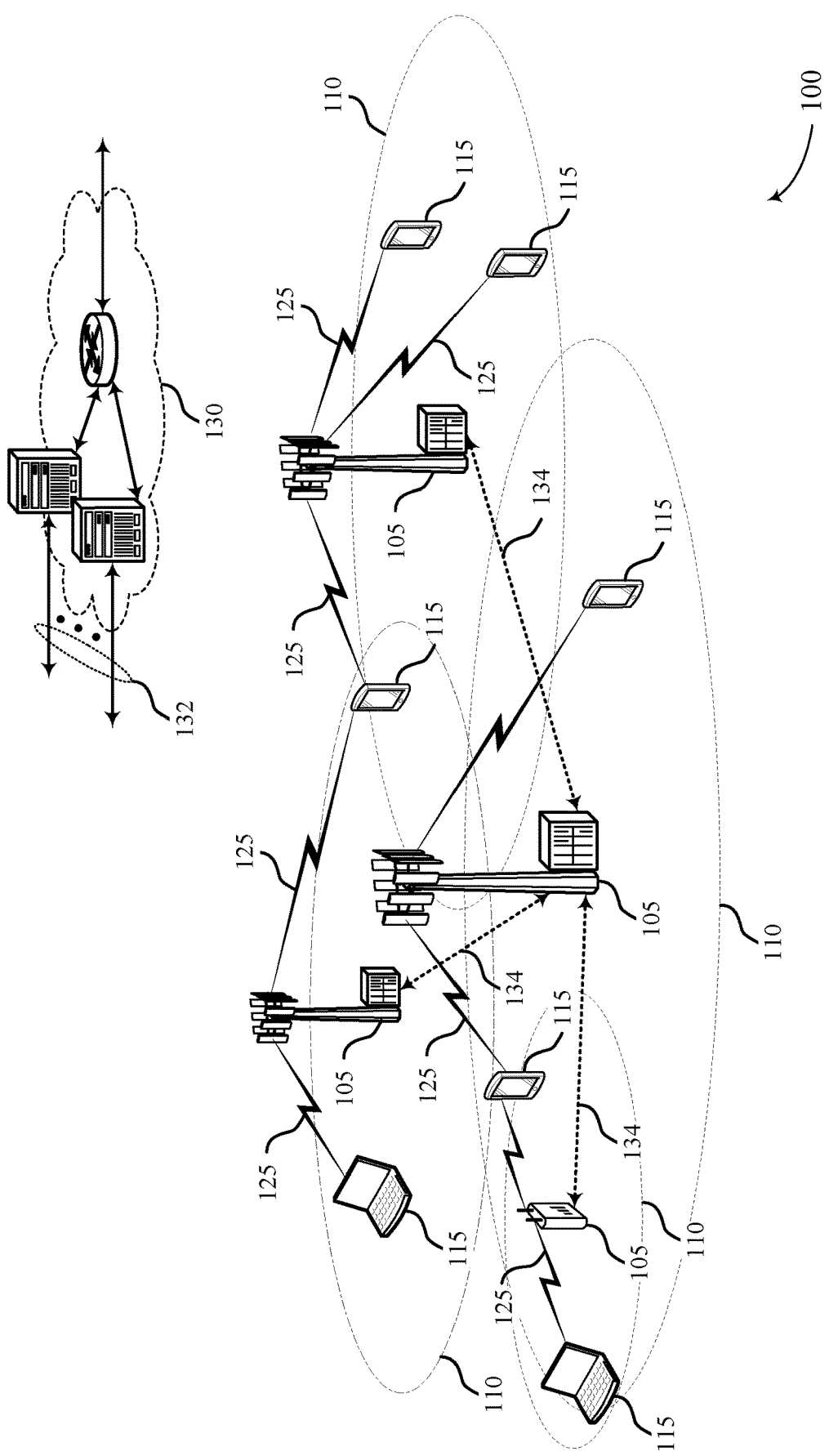
FIG. 1 illustrates an example of a system for wireless communications that supports handover techniques to provide service continuity with multiple concurrent connections in accordance with aspects of the present disclosure.

Wireless communication systems may use mobility management functions to manage the connectivity between a user equipment (UE) and one or more base stations or cells. For example, the mobility management function may initiate or otherwise support a handover procedure of the UE from a source base station to a target base station due to UE mobility, deteriorating channel conditions between the UE and the source base station, and the like. Some handover procedures may be considered a break-before-make (BBM) handover procedure where the UE loses connectivity to the source base station before, or during, a connection establishment with the target base station. Other handover procedures may be considered a make-before-break (MBB) handover procedure where the UE maintains at least some degree of connectivity to both the source base station and the target base station during a handover procedure, or at least a portion of the handover procedure. For example, during a MBB handover procedure the UE may be configured with various channels (e.g., control channels, data channels, etc.) with the target base station in addition to the channels configured for the UE by the source base station (e.g., using a dual active protocol stack (DAPS)). However, this approach may be problematic in that some UEs may not be able to maintain full connectivity to both the source and target base stations over all available resources during a handover procedure. For example, some UEs (e.g., low-tier UEs, power-limited UEs, wearable devices, etc.) may not support concurrent control channel monitoring, data receptions, or data transmissions from/to both the source and target base stations.

Further, in some cases, a UE may be configured with one or more high priority and low-latency channels (e.g., for ultra-reliable low latency communications (URLLC)). In such cases, in order to meet reliability and latency targets, it is highly desirable to maintain service continuity throughout the entire handover process. However, in some cases, where a UE may not support concurrent communications with both the source base station and the target base station, communications of such high priority and low-latency channels may be dropped if the UE selects a different communication in the event of a collision between the different communication and the high priority and low-latency communication.

According to various aspects of the disclosure, techniques are provided to prioritize different communications according to one or more predetermined priority rules. In some cases, a UE may establish a first connection with a source base station, and then initiate a handover procedure and establish a second connection with a target base station, where both the first connection and the second connection are active for at least a portion of the handover procedure. In some cases, the one or more priority rules may be used by to determine which communications to transmit or receive. In some cases, such priority rules may be established to provide enhanced service continuity for a high priority and low-latency channel relative to other channels with lower priority or more relaxed latency targets (e.g., enhanced mobile broadband (eMBB) communications.

In some cases, the priority rule(s) may provide that any communications with the target base station have priority over any communications with the source base station, or that any communications with the source base station have priority over any communications with the target base station. In other cases, the priority rule(s) may identify one or more channels (e.g., a URLLC channel) that have priority over other channels. Additionally or alternatively, the one or more priority rules may provide that multiple different communications (e.g., multiple different communications of different channels that are configured for concurrent communications) may be prioritized and the highest priority communication selected for transmission/reception processing, with other communications dropped. In some cases, the UE may support concurrent transmissions for some bands (e.g., intra-frequency and intra-band communications), and may not support concurrent transmissions for other bands (e.g., inter-frequency and inter-band communications). In such cases, the priority rule(s) may provide that two or more transmissions may be processed at the UE in accordance with the UE concurrent transmission capability, and that other transmissions may be dropped. In some cases, the one or more priority rules may be configured by the source base station, target base station, or combinations thereof. In some cases, the one or more priority rules may be provided to the UE via physical layer signaling, such as through radio resources control (RRC) signaling, downlink control information (DCI), or any combinations thereof. Additionally or alternatively, one or more priority rules may be provided through a prespecified order of priorities for the different channels.

Particular implementations of the subject matter described in this disclosure may be implemented to realize one or more of the following potential advantages. For example, the one or more priority rules may provide for enhanced continuity of high priority channels (e.g., channels used for URLLC). By enhancing continuity of such channels, system latency may be reduced, and reliability may be enhanced. Various described implementations may also reduce latency of handover and suspension of data transmission, and therefore increase signaling reliability, throughput, and user experience while reducing power consumption. The described advantages may be particularly beneficial for NR systems and communication requiring low latency quality of service (QoS) or corresponding to mission critical applications.

Aspects of the disclosure are initially described in the context of a wireless communications system. Aspects of the disclosure are further illustrated by and described with reference to a process flow, apparatus diagrams, system diagrams, and flowcharts that relate to handover techniques to provide service continuity with multiple concurrent connections.

FIG. 1 illustrates an example of a wireless communications system 100 that supports handover techniques to provide service continuity with multiple concurrent connections in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of or include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a UE 115 may initiate a handover procedure (e.g., based on a handover message received from a serving source base station 105) to change from the source base station 105 to a target base station 105 for communications (e.g., due to mobility of the UE 115 or interference associated with communications with the source base station). In some cases, the UE 115 may use one or more priority rules for determining communication priority during such a handover when concurrent connections with the source base station 105 and the target base station 105 are maintained (e.g., in a make-before-break handover) and the UE 115 is incapable of performing concurrent communications. In some cases, one or more priority rules may be used by such a UE 115 to determine which communications to transmit or receive. In some cases, the one or more priority rules may be established to provide enhanced service continuity for one or more higher priority or lower latency channels relative to other channels with lower priority or more relaxed latency targets.

Figure 2:
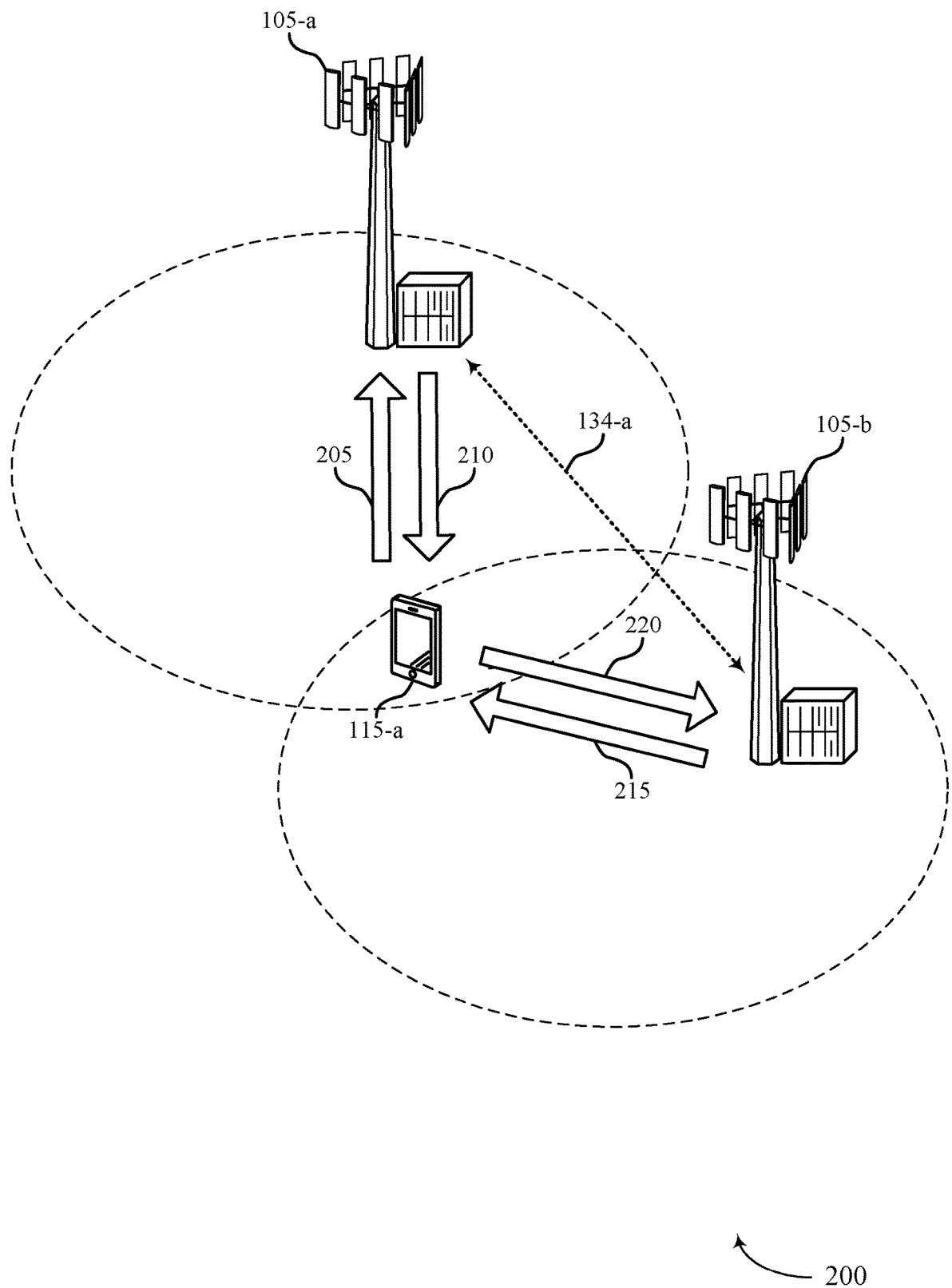
FIG. 2 illustrates an example of portion of a wireless communications system that supports handover techniques to provide service continuity with multiple concurrent connections in accordance with aspects of the present disclosure.

FIG. 2 illustrates an example of a wireless communications system 200 that supports handover techniques to provide service continuity with multiple concurrent connections in accordance with aspects of the present disclosure. In some examples, wireless communications system 200 may implement aspects of wireless communications system 100. For example, wireless communications system 200 may include source base station 105-a, target base station 105-b, and UE 115-a, which may be examples of the corresponding devices described with reference to FIG. 1.

Wireless communications system 200 may support prioritization of communications during a handover procedure to provide enhanced service continuity of one or more high priority services. In some cases, UE 115-a may not support multiple concurrent communications with one or more of the source base station 105-a, target base station 105-b, or both. In some cases, the UE 115-a may support concurrent communications for some frequency bands, and may not support concurrent communications for other frequency bands.

In wireless communications system 200, source base station 105-a and target base station 105-b may perform a handover procedure that may allow UE 115-a to maintain communication with both the source base station 105-a and the target base station 105-b until after handover is complete (e.g., using a DAPS) independent of the UE 115-a capability for concurrent communications. For example, in wireless communications system 200, UE 115-a may perform a handover and be connected to source base station 105-a (e.g., UE 115-a may communicate via data streams 205 and 210 with source base station 105-a) while also being connected to target base station 105-b (e.g., UE 115-a may communicate via data streams 215 and 220 with target base station 105-b).

In some cases, source base station 105-a may determine that UE 115-a is to perform a handover procedure to target base station 105-b. In some cases, source base station 105-a may make this determination based on signaling received from UE 115-a, for example, based on one or more signal measurements associated with a target cell served by target base station 105-b. The handover procedure may continue with source base station 105-a sending a handover request in handover preparation to target base station 105-b via backhaul link 134-a to configure one or more bearers for the UE 115-a. Target base station 105-b may determine if the UE 115-a is able to be served and configure the one or more bearers, and then transmit the decision on the proposed configuration in a handover response message to source base station 105-a via backhaul link 134-a.

Once a radio bearer configuration is agreed to by source base station 105-a and target base station 105-b, both base stations 105 may configure their bearers according to the agreement. Source base station 105-a may then transmit a handover command to UE 115-a with the radio bearer configuration to be used for handover. The handover command may include an RRC reconfiguration message, and the handover command may be generated by target base station 105-b. Based on the handover command, UE 115-a may configure its bearers based on the radio bearer configuration received. UE 115-a may receive and/or transmit data streams according to the bearer configuration during the handover procedure. Further, UE 115-a may maintain the bearer configuration until UE 115-a receives a new bearer configuration from a base station 105.

In some examples, when the handover is successful, target base station 105-b may indicate (e.g., via RRC reconfiguration or grant) that UE 115-a may drop source base station 105-a radio bearers or reconfigure source base station 105-a radio bearers to target base station 105-b radio bearers. If UE 115-a transmits a handover completion message, UE 115-a may drop or reconfigure source base station 105-a radio bearers after transmitting the handover completion message.

In some cases, during at least a portion of the handover procedure, the UE 115-a may receive grants for concurrent communications with both the source base station 105-a and the target base station 105-b. However, the UE 115-a may not be capable of such concurrent communications. In such cases, the UE 115-a may drop one or more transmissions (e.g., one or more downlink transmissions or one or more uplink transmissions) that collide with one or more other transmissions. In some cases, the UE 115-a may use one or more priority rules to select which communication(s) to maintain and which to drop.

In some cases, the UE 115-a may not be capable of supporting any concurrent communications, such as in the case of a low-tier UE, a power-limited UE, and the like. In other cases, the UE 115-a may be capable of supporting some concurrent communications depending upon a frequency band of the multiple communications, and may not be capable of supporting concurrent communications outside of such frequency bands. For example, both the source base station 105-a and the target base station 105-b may operate in sub-six GHz (e.g., frequency range one (FR1)) and the UE 115-a may support simultaneous transmission/reception for synchronous and/or asynchronous communications for at least some combinations of source and target frequency bands. Further, in some cases, simultaneous communications may be dependent upon one or more other factors, such as sub-carrier spacing (SCS) of the source base station 105-a and the target base station 105-b, power constraints (e.g., power spectral density (PSD) limit differences between cells or maximum transmit power limits), contiguous or non-contiguous resource allocations, whether the concurrent communications use a common physical resource block (PRB) grid, and the like.

In cases where the UE 115-*a* is unable to concurrently communicate with both the source base station 105-*a* and the target base station 105-*b*, as discussed herein, the UE 115-*a* may select one or more of the concurrent communications for processing (e.g., transmit/receive processing for transmission/reception) and drop one or more other of the concurrent communications. In some cases, higher priority channels (e.g., that may be used for URLLC) may be indicated to the UE at the physical layer, and given a relatively high priority to enhance the likelihood that such higher priority channels are selected for processing at the UE 115-*a*. In some cases, a number of different priorities for a number of different channels may be provided by either the source base station 105-*a* or the target base station 105-*b*. For example, a priority of scheduling request (SR) transmissions may be indicated by RRC signaling, a priority of a physical uplink control channel (PUCCH) may be provided in a DCI that schedules an associated physical downlink shared channel (PDSCH) transmission, a priority of a PUCCH for a semi-persistent-scheduling (SPS) PDSCH may be provided in the DCI scheduling SPS-PDSCH, a priority for a PUCCH for an SPS-PDSCH may be indicated by RRC and/or the DCI activating/releasing the SPS configuration, a priority for a dynamic grant (DG) physical uplink shared channel (PUSCH) may be indicated via the DCI scheduling the DG-PUSCH, a priority for a configured grant (CG) PUSCH may be indicated via RRC, a priority for a beam failure recovery (BFR) PUCCH may be indicated by RRC for each of one or more PUCCH groups associated with the beam. In some cases, each of the indicated priorities may be provided relative to one or more other priorities. In some cases, the source base station 105-*a*, target base station 105-*b*, or both, may provide a list of priorities that are associated with a number of different channels (e.g., via RRC, DCI, or other communications, such as remaining minimum system information (RMSI)).

In some cases, the one or more priority rules may indicate that communications (e.g., uplink transmissions, downlink transmissions, or both) with the target base station 105-*b* are prioritized over communications with the source base station 105-*a*. In such cases, the UE 115-*a* will select communications of the target base station 105-*b* and drop communications of the source base station 105-*a* in the event of a collision in the communications. In other cases, communications with the source base station 105-*a* are prioritized over communications with the target base station 105-*b*.

In some cases, the one or more priority rules may indicate a priority associated with a particular channel, and in the event that communications have a collision, the UE 115-*a* selects the higher priority channel communication and drops others. In such cases, if the colliding channels have a same priority, the UE 115-*a* may prioritize communications with the target base station 105-*b* (or prioritize communications with the source base station 105-*a*). In other cases, prioritization may be based on channel type. For example, if the colliding communications are uplink communications, a physical random access channel (PRACH) may have a highest priority, followed by a PUSCH with uplink control information (UCI), followed by PUCCH, followed by PUSCH without UCI, and so on for other lower priority channels. Further, within each channel priority, communications with the target base station 105-*b* (or source base station 105-*a*) may be prioritized (e.g., . . . > PUSCH with UCI to target> PUSCH with UCI to source> . . . ).

Further, in some cases, multiple different channels of the source base station 105-*a* and the target base station 105-*b* may collide. In such cases, the one or more priority rules may indicate that the UE 115-*a* is to first resolve the collision amongst the channels of the target base station 105-*b* for target and also resolve the collision amongst the channels of the source base station 105-*a*. Thus, in such cases, the UE 115-*a* separately determines an order of priorities of the communications for both the source base station 105-*a* and the target base station 105-*b*. For example, if multiple low and high priority uplink channels intended for the source base station 105-*a* are colliding, the UE 115-*a* may multiplex the low priority channels and multiplex the high priority channels, with a multiplexed priority associated with a highest (or lowest) priority of the multiplexed channels used to determine priority. If the multiplexed channels are colliding, the UE 115-*a* may either drop the low priority channel(s), or multiplex the low priority channels with the high priority channel(s). Then, the UE 115-*a* may resolve any collisions amongst the multiplexed channels intended for the source base station 105-*a* and the target base station 105-*b* based on one or more priority rules as discussed above.

In other cases, in the event of multiple colliding communications for one or both of the source base station 105-*a* and the target base station 105-*b*, the UE 115-*a* may first resolve the collisions based on the associated channel priority regardless of whether the channels are for the source base station 105-*a* or the target base station 105-*b*. Then, if channels of the same priority are still colliding, the UE may resolve the collision based on one or more priority rules as discussed above.

While various examples discussed herein describe uplink transmissions from the UE 115-*a* to the source base station 105-*a*, target base station 105-*b*, or both, techniques as provided herein are also applicable to multiple concurrent downlink transmissions that may be transmitted to the UE 115-*a*. In some such cases, if multiple downlink channels from the source base station 105-*a* and multiple channels from the target base station 105-*b* collide, the UE 115-*a* may first resolve the collision amongst the channels from the source base station 105-*a* and the channels from the target base station 105-*b*, and then resolve any collision amongst the channels from the source and target based on priority rules as discussed herein. For example, if DG-PDSCH and one or multiple SPS occasions of different SPS configurations are colliding (all from the source), the UE 115-*a* may resolve the collision amongst them first (e.g., if DG-PDSCH is of low priority, and one of the SPS occasions is of high priority, the UE 115-*a* may expect to receive downlink data on that occasion only), and then resolve collision with the target. In other cases, in the event of collision of multiple downlink transmissions, the UE 115-*a* may first resolve the collision based on the priority regardless of whether the channels are from the source or the target, and then if the channels of the same priority are still colliding, follow the one or more priority rules as discussed herein.

Figure 3:
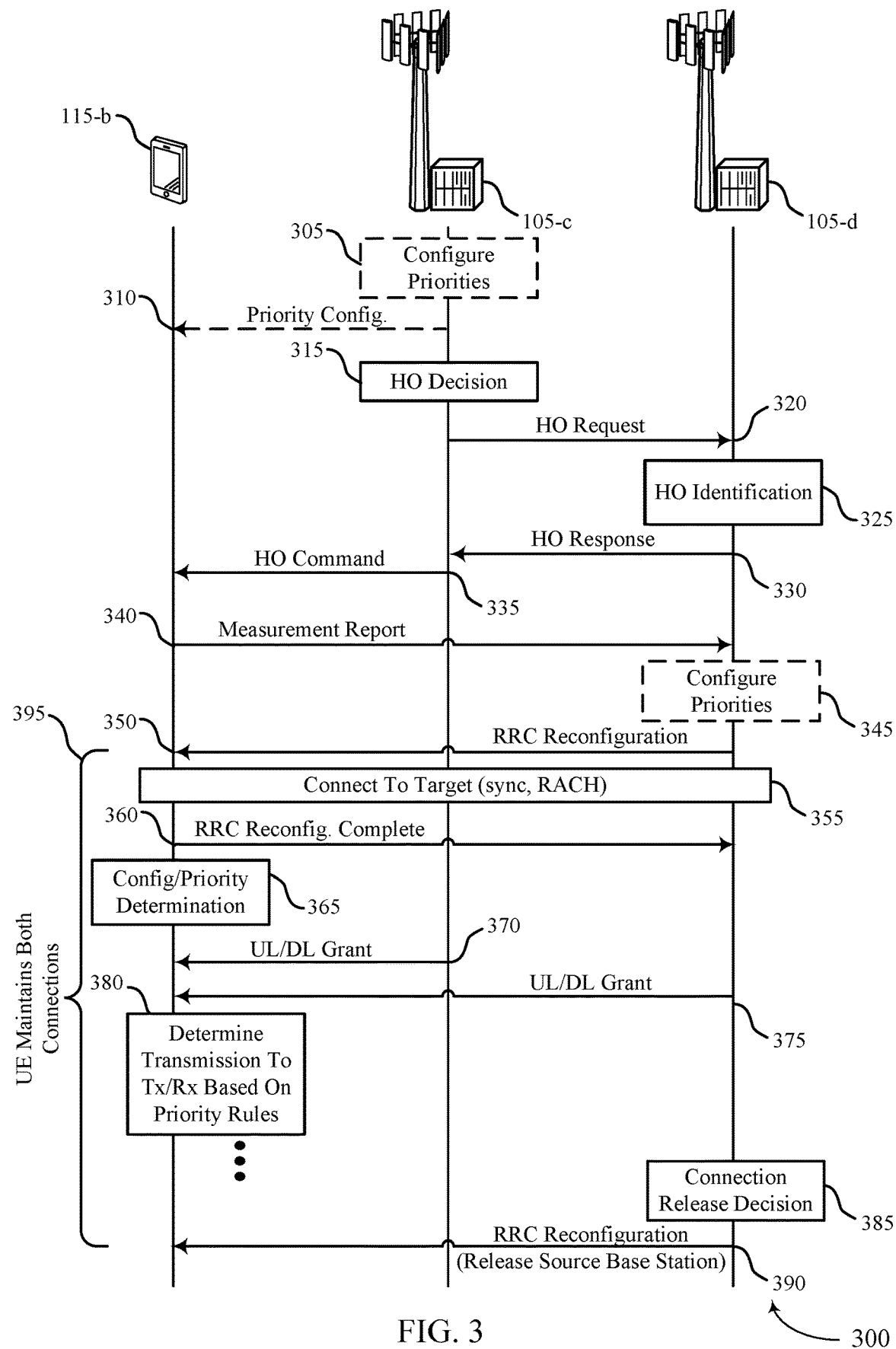
FIG. 3 illustrates an example of a process flow that supports handover techniques to provide service continuity with multiple concurrent connections in accordance with aspects of the present disclosure.

FIG. 3 illustrates an example of a process flow 300 that supports handover techniques to provide service continuity with multiple concurrent connections in accordance with aspects of the present disclosure. In some examples, process flow 300 may implement aspects of wireless communications system 100. Process flow 300 may include UE 115-*b*, source base station 105-*c*, and target base station 105-*d*, which may be examples of the corresponding devices described with reference to FIGS. 1 and 2. In this example, the UE 115-*b* may have an established connection with the source base station 105-*c*, and mobility of the UE 115-*b* may result in a handover procedure being triggered.

Optionally, at 305, source base station 105-*c* may configure one or more priority rules for processing or dropping one or more concurrent communications with both the source base station 105-*c* and the target base station 105-*d*. In some cases, the one or more priority rules may be configured based on a capability of the UE 115-*b* that indicates the UE 115-*b* is not capable of concurrent communications. In some cases, the source base station 105-*c* may, if such priority rules are configured, transmit the priority configuration to the UE 115-*b* at 310. In some cases, additionally or alternatively, one or more priority rules may be preconfigured at the UE 115-*b* (e.g., according to a specification that defines priorities for a number of different channels and for source/target communications).

At 315, the source base station 105-*c* may make a handover decision to initiate a handover procedure for UE 115-*b* to be performed with target base station 105-*d*. For example, the determination may be based on mobility of the UE 115-*b* or measurement reports received from UE 115-*b*.

At 320, source base station 105-*c* may transmit a handover request to the target base station 105-*d*. The handover request may include a request, for example, for one or more bearers. At 325, target base station 105-*d* may identify the handover request, and determine parameters for the one or more radio bearers. At 330, target base station 105-*d* may transmit a response to the handover request to source base station 105-*c* for the handover of UE 115-*b*. The response may indicate the one or more radio bearer configurations for the handover procedure. In some cases, the response may include an indication of a handover command to be transmitted from source base station 105-*c* to UE 115-*b* at 335.

At 340, the UE 115-*b* may receive the handover command, and may provide a measurement report to the target base station 105-*d*. The measurement report may allow the target base station 105-*d*, for example, to determine one or more transmission parameters (e.g., a modulation and coding scheme (MCS), transmission power, etc.) for a second connection with the target base station 105-*d*.

Optionally, at 345, the target base station 105-*d* may configure one or more priority rules for concurrent transmissions of the source base station 105-*c* and the target base station 105-*d*. In some cases, the one or more priority rules may be configured based on a capability of the UE 115-*b* that indicates the UE 115-*b* is not capable of concurrent communications. In some cases, the target base station 105-*d* may, if such priority rules are configured, transmit the priority configuration to the UE 115-*b* along with an RRC reconfiguration at 350. In some cases, additionally or alternatively, one or more priority rules may be preconfigured at the UE 115-*b* (e.g., according to a specification that defines priorities for a number of different channels and for source/target communications). The RRC reconfiguration may include a reconfiguration message from target base station 105-*d*, and the reconfiguration message may include a reconfiguration of at least one radio bearer for communications with target base station 105-*d*.

At 355, the UE 115-*b* may establish a second connection with the target base station 105-*d*. In some cases, such a connection establishment may include determine cell synchronization, transmitting a random access channel (RACH) request message, receiving a RACH response, and the like, in accordance with established connection establishment techniques. The second connection may be established while the first connection is maintained, and thus the UE 115-*b* may maintain both connections, as indicated at 395, until one of the connections is released.

At 360, the UE 115-*b* may transmit an RRC reconfiguration complete message to the target base station 105-*d*. At 365, the UE 115-*b* may configure one or more priority rules based on received priority configurations, preconfigured or prespecified priority configuration, or any combinations thereof. In some cases, one or more priority indications may be provided in DCI with a resource grant from the source base station 105-*c* or the target base station 105-*d*, and such priority indications may be used with the priority rules to determine which communications to process and which communications to drop.

At 370, the source base station 105-*c* may transmit an uplink or downlink grant to the UE 115-*b*, that indicates a first set of resources. At 375, the target base station 105-*d* may transmit an uplink or downlink grant to the first UE, that indicates a second set of resources, which may be colliding resources with the first set of resources.

At 380, the UE 115-*b* may determine that it is not capable of concurrently transmitting or receiving on the first set of resources and the second set of resources. In such cases, the UE 115-*b* may determine which transmission of the source base station 105-*c* or the target base station 105-*d* is to be processed (i.e., transmitted or received) and which transmission is to be dropped. Such a determination may be made according to any of the priority rules or techniques as discussed herein.

At 385, the target base station 105-*d* may determine to release the first connection. Such a determination may be made, for example, based on a reliable connection being established with the UE 115-*b*. At 390, the target base station 105-*d* may transmit an RRC reconfiguration to the UE 115-*b* to release the first connection with the source base station 105-*c*.

Figure 4:
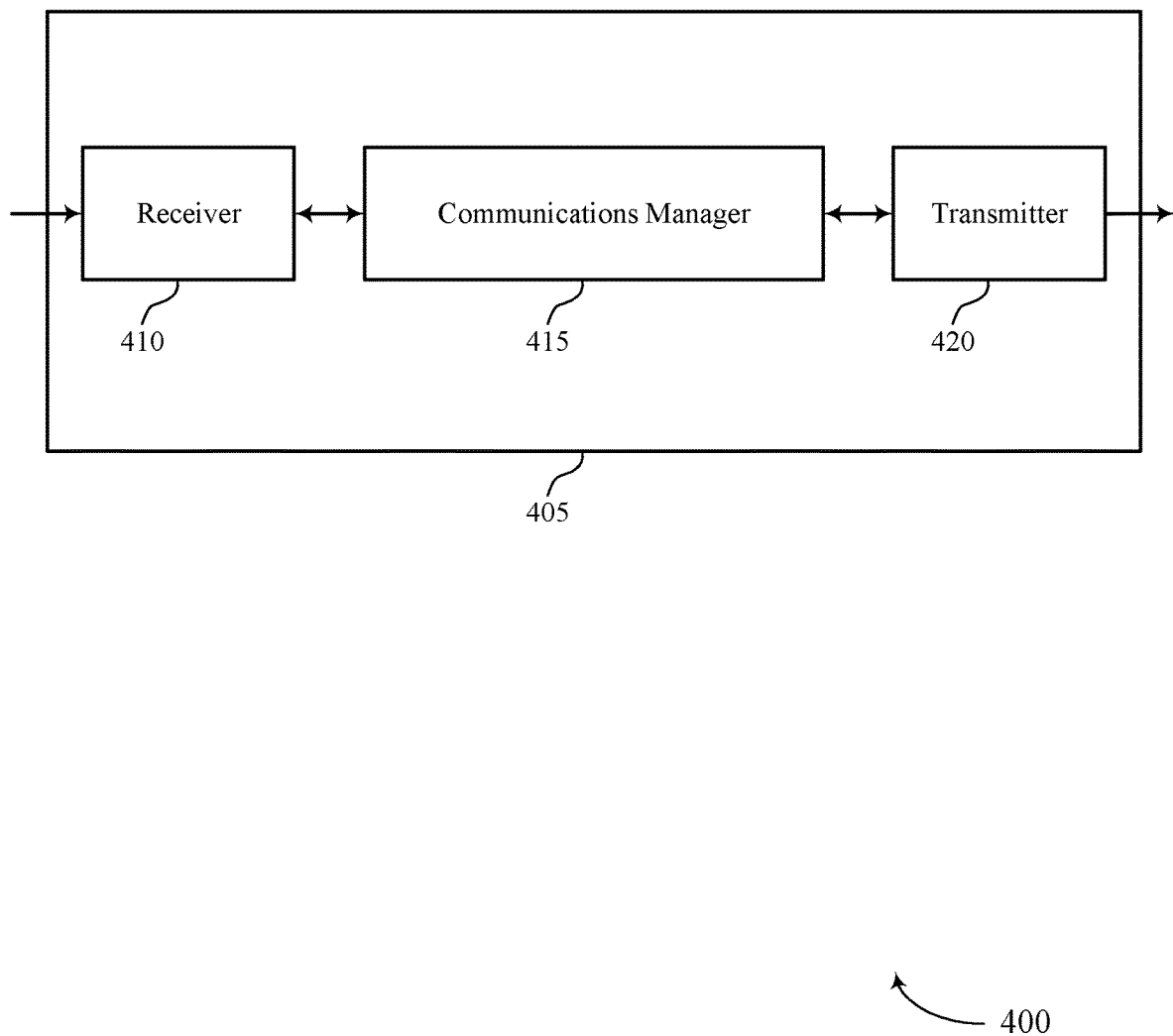
FIGS. 4 and 5 show block diagrams of devices that support handover techniques to provide service continuity with multiple concurrent connections in accordance with aspects of the present disclosure.

FIG. 4 shows a block diagram 400 of a device 405 that supports handover techniques to provide service continuity with multiple concurrent connections in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to handover techniques to provide service continuity with multiple concurrent connections, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may establish, while connected with a source base station via a first connection, a second connection with a target base station responsive to initiating a handover procedure from the source base station to the target base station, where both the first connection and the second connection are active for at least a portion of the handover procedure, identify a first transmission of the source base station that at least partially overlaps in time with a second transmission of the target base station while both the first connection and the second connection are active, determine which of the first transmission or the second transmission is a higher priority transmission, and process the higher priority transmission based on the determining. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. The actions performed by the communications manager 415 as described herein may be implemented to realize one or more potential advantages. One implementation may allow a UE 115 implement one or more priority rules which may provide for enhanced continuity of high priority channels (e.g., channels used for URLLC). Another implementation may enhance continuity of such channels, as latency may be reduced, and reliability at the UE 115 may be increased.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
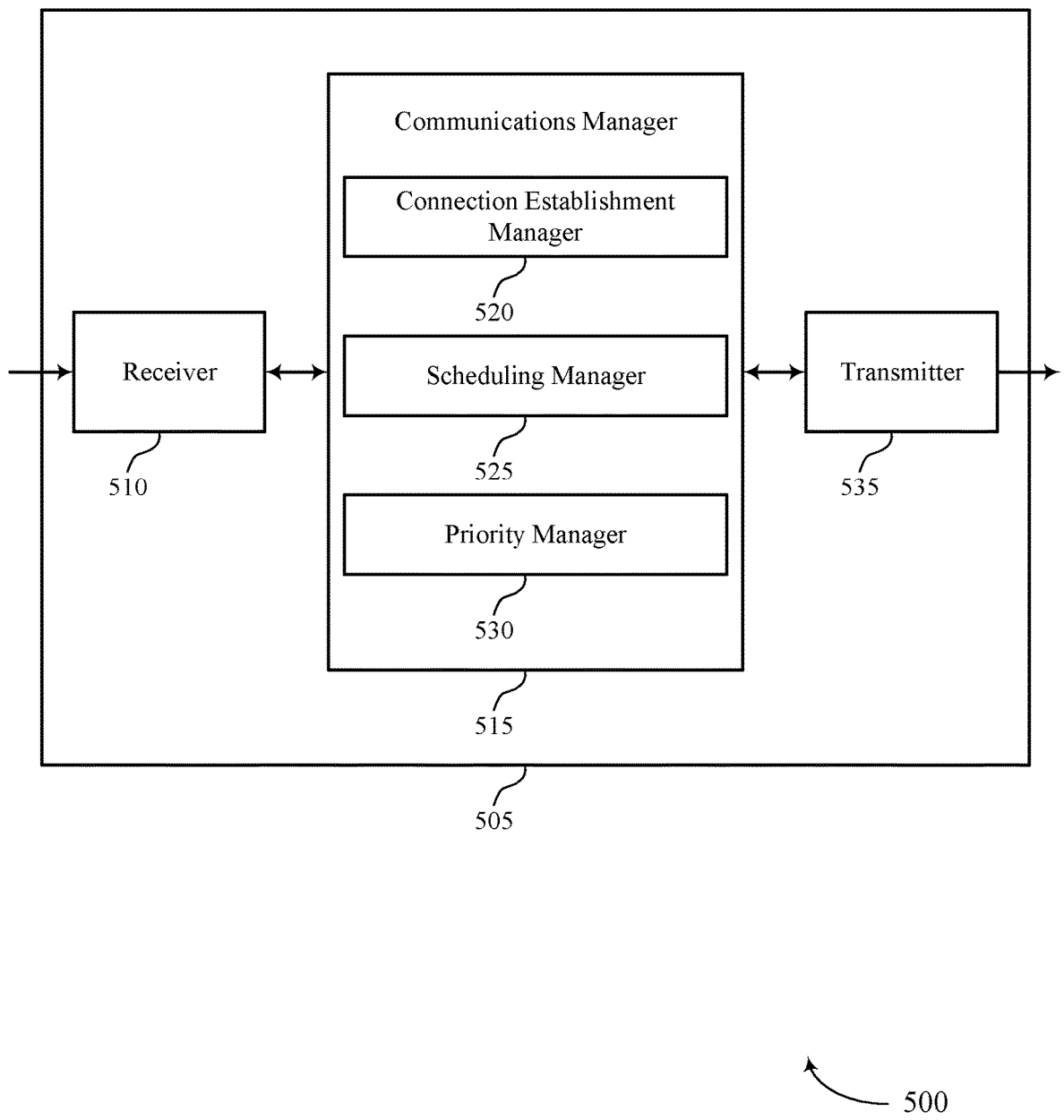

FIG. 5 shows a block diagram 500 of a device 505 that supports handover techniques to provide service continuity with multiple concurrent connections in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to handover techniques to provide service continuity with multiple concurrent connections, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a connection establishment manager 520, a scheduling manager 525, and a priority manager 530. The communications manager 515 may be an example of aspects of the communications manager 710 described herein.

The connection establishment manager 520 may establish, while connected with a source base station via a first connection, a second connection with a target base station responsive to initiating a handover procedure from the source base station to the target base station, where both the first connection and the second connection are active for at least a portion of the handover procedure.

The scheduling manager 525 may identify a first transmission of the source base station that at least partially overlaps in time with a second transmission of the target base station while both the first connection and the second connection are active.

The priority manager 530 may determine which of the first transmission or the second transmission is a higher priority transmission and process the higher priority transmission based on the determining.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
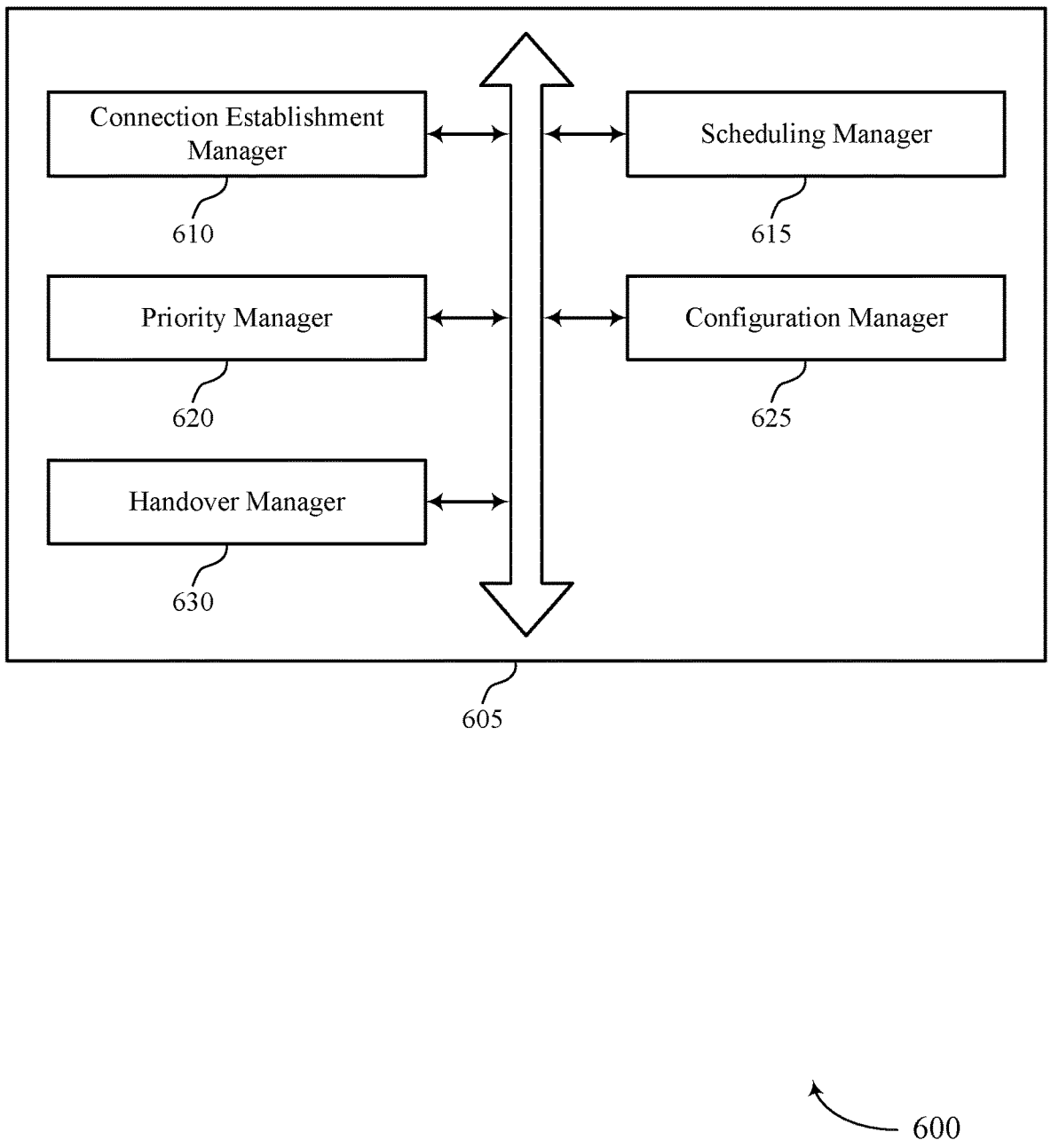
FIG. 6 shows a block diagram of a communications manager that supports handover techniques to provide service continuity with multiple concurrent connections in accordance with aspects of the present disclosure.

FIG. 6 shows a block diagram 600 of a communications manager 605 that supports handover techniques to provide service continuity with multiple concurrent connections in accordance with aspects of the present disclosure. The communications manager 605 may be an example of aspects of a communications manager 415, a communications manager 515, or a communications manager 710 described herein. The communications manager 605 may include a connection establishment manager 610, a scheduling manager 615, a priority manager 620, a configuration manager 625, and a handover manager 630. Each of these modules may communicate, directly or indirectly, with one another (e.g., via one or more buses).

The connection establishment manager 610 may establish, while connected with a source base station via a first connection, a second connection with a target base station responsive to initiating a handover procedure from the source base station to the target base station, where both the first connection and the second connection are active for at least a portion of the handover procedure.

The scheduling manager 615 may identify a first transmission of the source base station that at least partially overlaps in time with a second transmission of the target base station while both the first connection and the second connection are active. In some examples, the scheduling manager 615 may communicate the second transmission with the target base station. In some examples, the scheduling manager 615 may drop the first transmission with the source base station. In some cases, a first set of transmissions of the source base station are at least partially overlapping in time with a second set of transmissions of the target base station. In some cases, the first set of transmissions includes the first transmission and the second set of transmissions includes the second transmission.

The priority manager 620 may determine which of the first transmission or the second transmission is a higher priority transmission. In some examples, the priority manager 620 may process the higher priority transmission based on the determination.

In some examples, the priority manager 620 may identify that communications with the target base station have priority over communications with the source base station. In some examples, the priority manager 620 may determine that the second transmission is the higher priority transmission based on the second transmission being with the target base station.

In some examples, the priority manager 620 may determine that the second transmission is the higher priority transmission based on the indication. In some examples, the priority manager 620 may identify that both the first transmission and the second transmission have a same priority. In some examples, the priority manager 620 may identify that communications with the target base station have priority over communications with the source base station. In some cases, the determining that the second transmission is the higher priority transmission is based on the priority for each of the plurality of different types of transmissions applied to one or more of the first set of transmissions or the second set of transmissions.

In some cases, the priority for each of the plurality of different types of transmissions is applied separately to each of the first set of transmissions and the second set of transmissions, and where the determining which of the first transmission or the second transmission is the higher priority transmission is based on one or more of the priority for each of the plurality of different types of transmissions or which of the source base station or the target base station is associated with the transmission.

In some cases, the priority for each of the plurality of different types of transmissions is applied jointly across both of the first set of transmissions and the second set of transmissions, and where the determining which of the first transmission or the second transmission is the higher priority transmission is based on one or more of the priority for each of the plurality of different types of transmissions or which of the source base station or the target base station is associated with the transmission.

In some cases, the priority for each of the plurality of different types of transmissions is based on a channel type of an associated transmission. In some cases, the priority for each of the plurality of different types of transmissions is further based on whether the associated transmission is for the source base station or the target base station.

The configuration manager 625 may receive an indication of a priority for each of the plurality of different types of transmissions of a set of different types of transmissions. In some cases, the priority for each of the plurality of different types of transmissions is received in one or more of radio resource control signaling, downlink control information, or any combinations thereof.

The handover manager 630 may configure and perform handover procedures. In some cases, the first transmission and the second transmission are uplink transmissions from the UE to the source base station or the target base station. In some cases, the first transmission and the second transmission are downlink transmissions from the source base station or the target base station to the UE.

Figure 7:
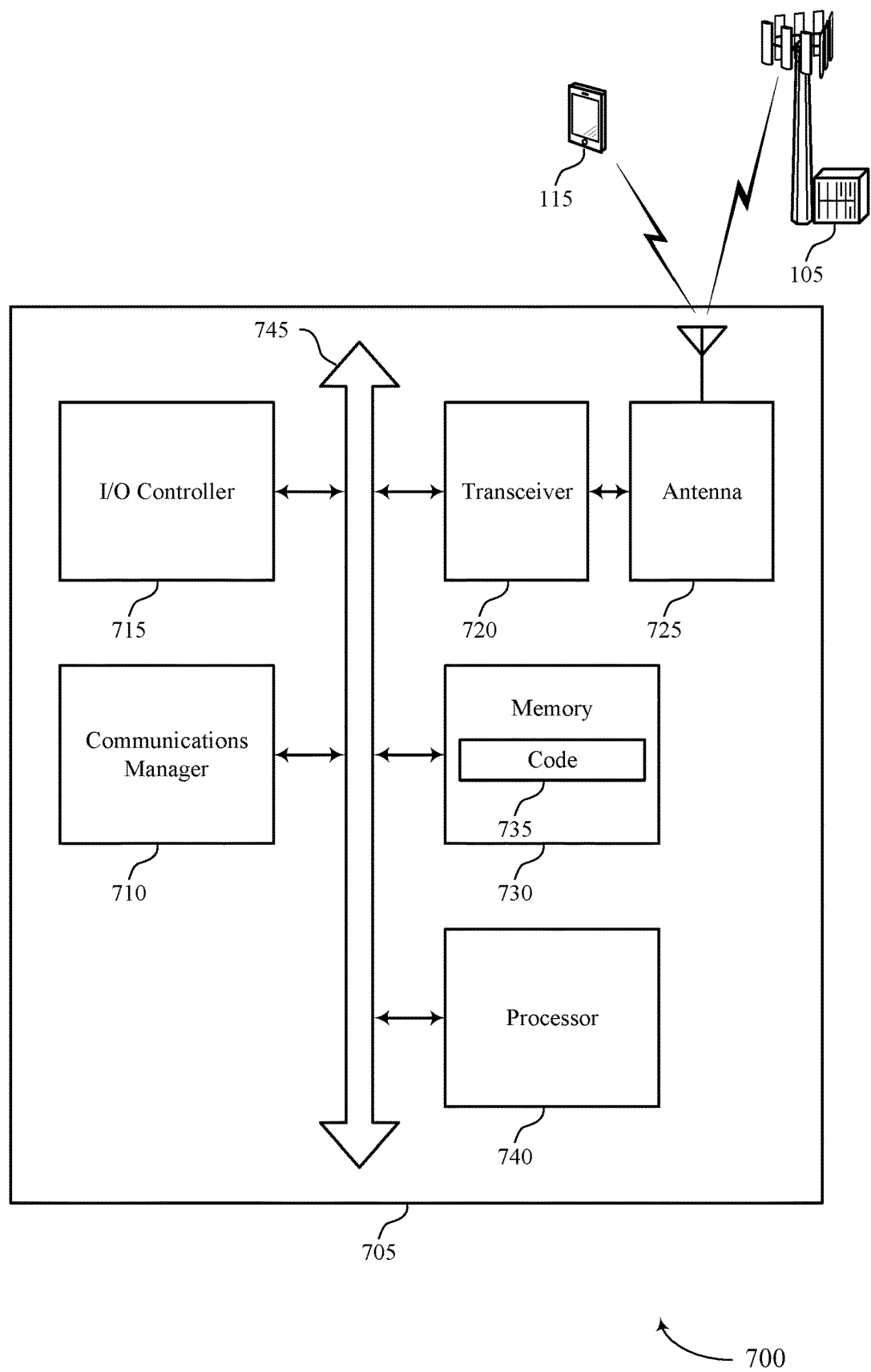
FIG. 7 shows a diagram of a system including a device that supports handover techniques to provide service continuity with multiple concurrent connections in accordance with aspects of the present disclosure.

FIG. 7 shows a diagram of a system 700 including a device 705 that supports handover techniques to provide service continuity with multiple concurrent connections in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may establish, while connected with a source base station via a first connection, a second connection with a target base station responsive to initiating a handover procedure from the source base station to the target base station, where both the first connection and the second connection are active for at least a portion of the handover procedure, identify a first transmission of the source base station that at least partially overlaps in time with a second transmission of the target base station while both the first connection and the second connection are active, determine which of the first transmission or the second transmission is a higher priority transmission, and process the higher priority transmission based on the determining.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases, the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting handover techniques to provide service continuity with multiple concurrent connections).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The actions performed by the processor 740, memory 730, I/O controller 715, communications manager 710, transceiver 720, and antenna 725 as described herein may be implemented to realize one or more potential advantages. One implementation may allow the device 705 to increase signaling reliability, throughput, and user experience while reducing power consumption. Another implementation of the one or more priority rules may provide for enhanced continuity of high priority channels (e.g., channels used for URLLC).

Figure 8:
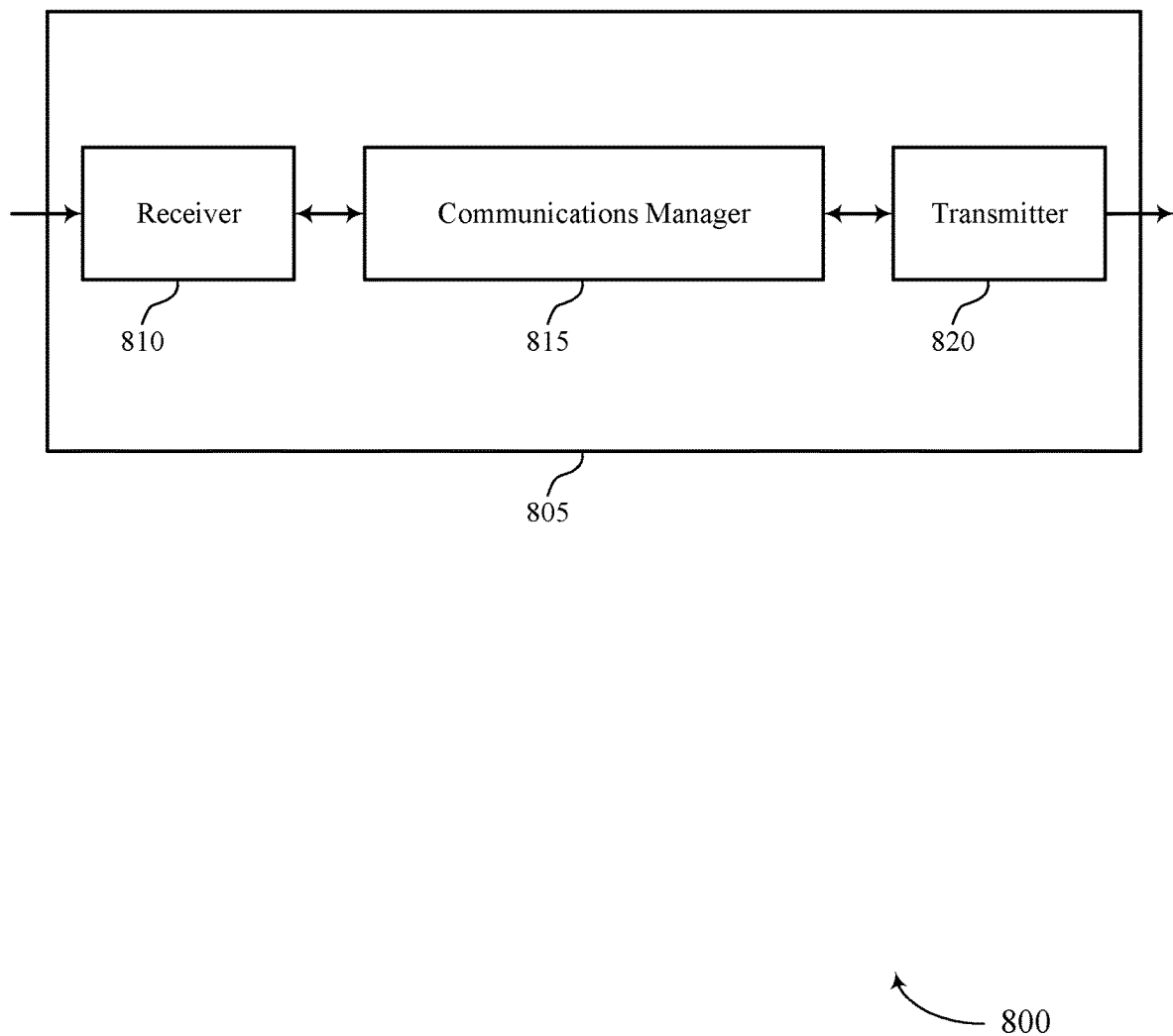
FIGS. 8 and 9 show block diagrams of devices that support handover techniques to provide service continuity with multiple concurrent connections in accordance with aspects of the present disclosure.

FIG. 8 shows a block diagram 800 of a device 805 that supports handover techniques to provide service continuity with multiple concurrent connections in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to handover techniques to provide service continuity with multiple concurrent connections, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station, initiate the handover procedure with the UE to handover the UE from the source base station to the target base station, and communicate with the UE during the handover procedure based on the priority information. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
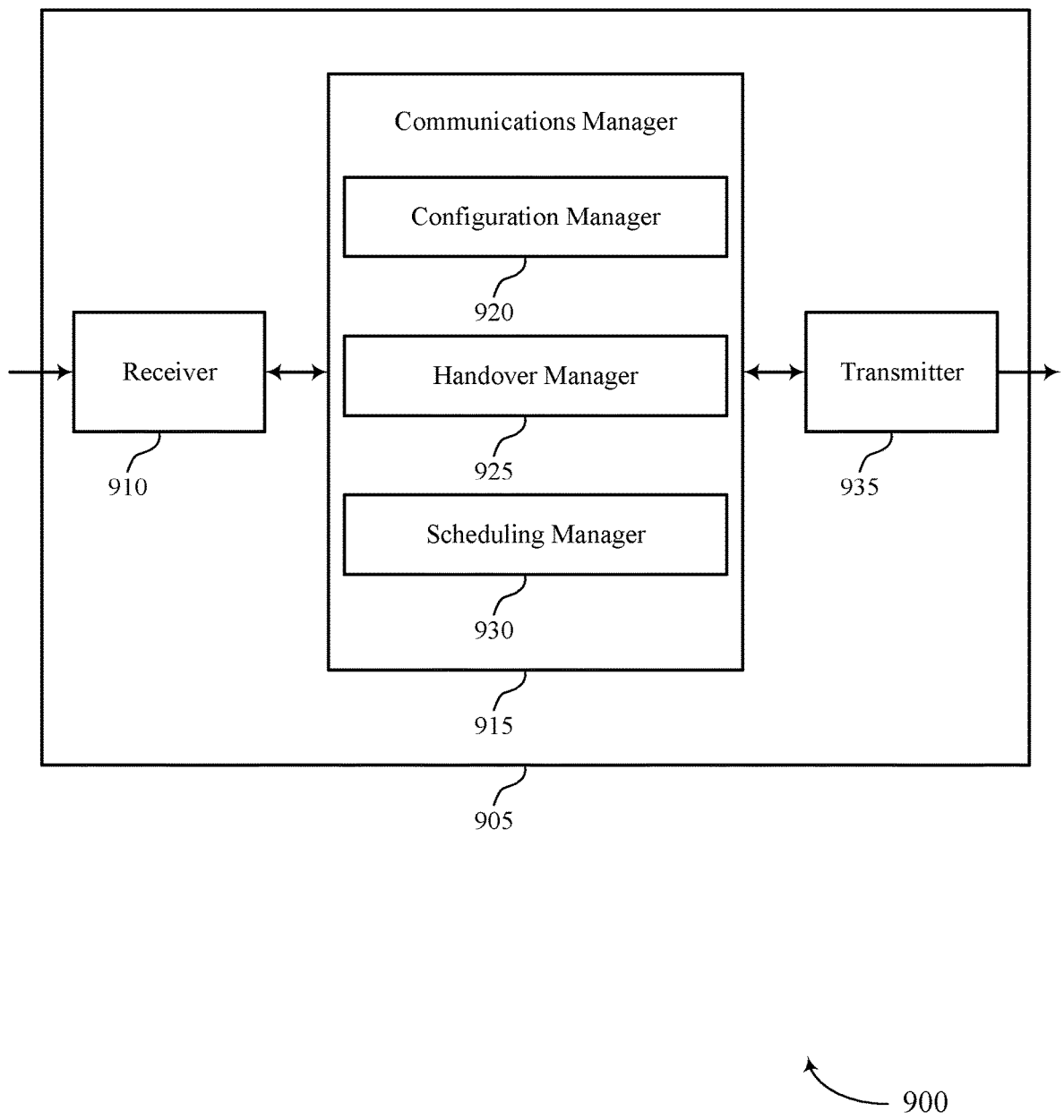

FIG. 9 shows a block diagram 900 of a device 905 that supports handover techniques to provide service continuity with multiple concurrent connections in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to handover techniques to provide service continuity with multiple concurrent connections, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920, a handover manager 925, and a scheduling manager 930. The communications manager 915 may be an example of aspects of the communications manager 1110 described herein.

The configuration manager 920 may transmit, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station.

The handover manager 925 may initiate the handover procedure with the UE to handover the UE from the source base station to the target base station.

The scheduling manager 930 may communicate with the UE during the handover procedure based on the priority information.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
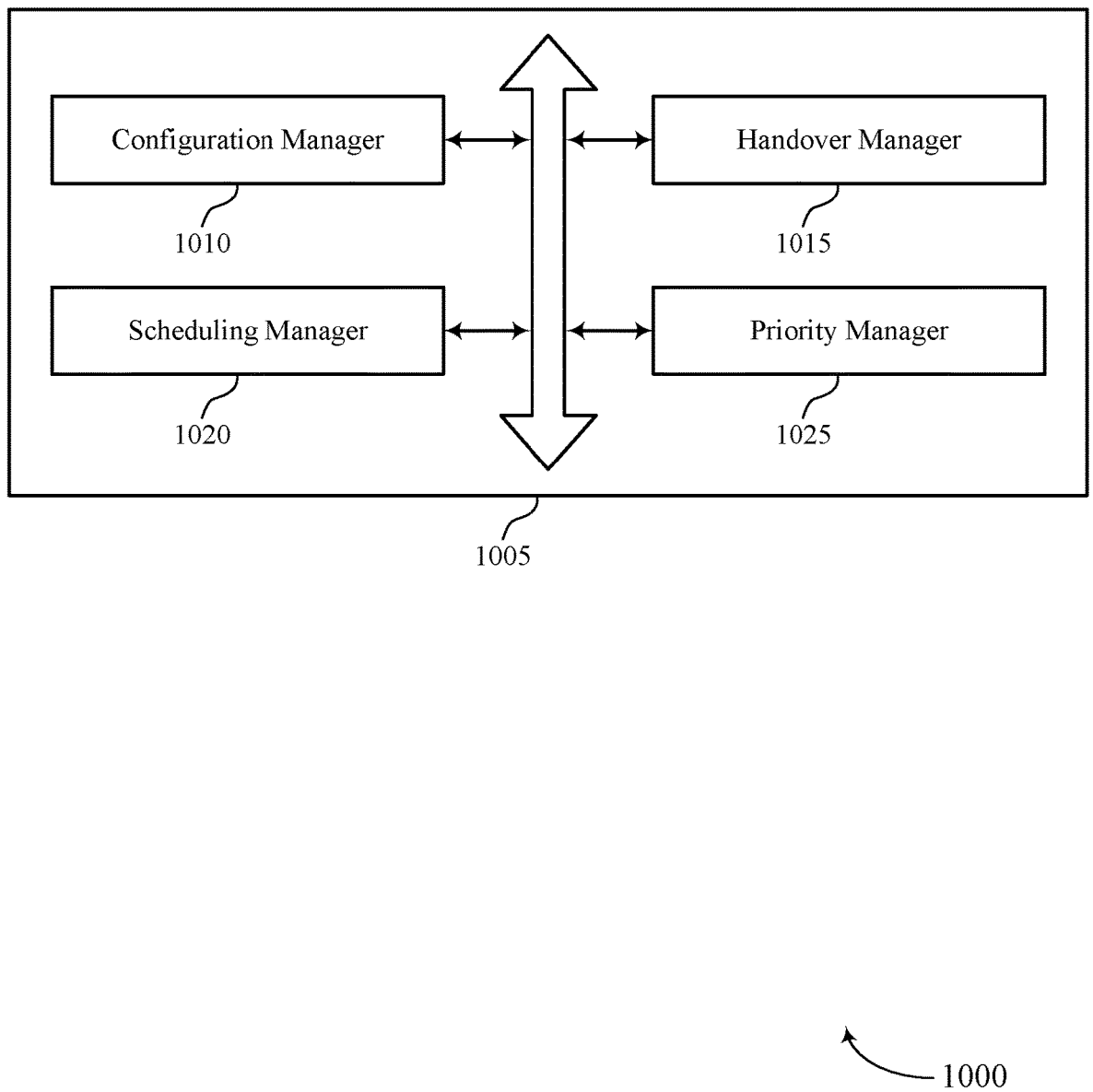
FIG. 10 shows a block diagram of a communications manager that supports handover techniques to provide service continuity with multiple concurrent connections in accordance with aspects of the present disclosure.

FIG. 10 shows a block diagram 1000 of a communications manager 1005 that supports handover techniques to provide service continuity with multiple concurrent connections in accordance with aspects of the present disclosure. The communications manager 1005 may be an example of aspects of a communications manager 815, a communications manager 915, or a communications manager 1110 described herein. The communications manager 1005 may include a configuration manager 1010, a handover manager 1015, a scheduling manager 1020, and a priority manager 1025. Each of these modules may communicate, directly or indirectly, with one another (e.g., via one or more buses).

The configuration manager 1010 may transmit, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station.

The handover manager 1015 may initiate the handover procedure with the UE to handover the UE from the source base station to the target base station. In some cases, the set of concurrent transmissions are uplink transmissions from the UE to the source base station or the target base station. In some cases, the set of concurrent transmissions are downlink transmissions from the source base station or the target base station to the UE.

The scheduling manager 1020 may communicate with the UE during the handover procedure based on the priority information.

The priority manager 1025 may identify or configure one or more priority rules, and provide priority information to the UE. In some cases, the priority information indicates that communications with the target base station have priority over communications with the source base station. In some cases, the priority information further indicates that, when transmission types have a same priority level, communications with the target base station have priority over communications with the source base station.

In some cases, the priority information is further applied by the UE when the set of concurrent transmissions include a first set of transmissions of the source base station, a second set of transmissions of the target base station, or combinations thereof.

In some cases, the priority information is applied separately to each of the first set of transmissions and the second set of transmissions, and where the priority information indicates which of the source base station or the target base station has higher priority within each of the set of different types of transmissions.

In some cases, the priority information is applied jointly across both of the first set of transmissions and the second set of transmissions, and where the priority information indicates which of the source base station or the target base station has higher priority within each of the set of different types of transmissions.

In some cases, the priority information is based on a channel type of the set of different types of transmissions. In some cases, the priority information is transmitted to the UE in one or more of radio resource control signaling, downlink control information, or any combinations thereof.

Figure 11:
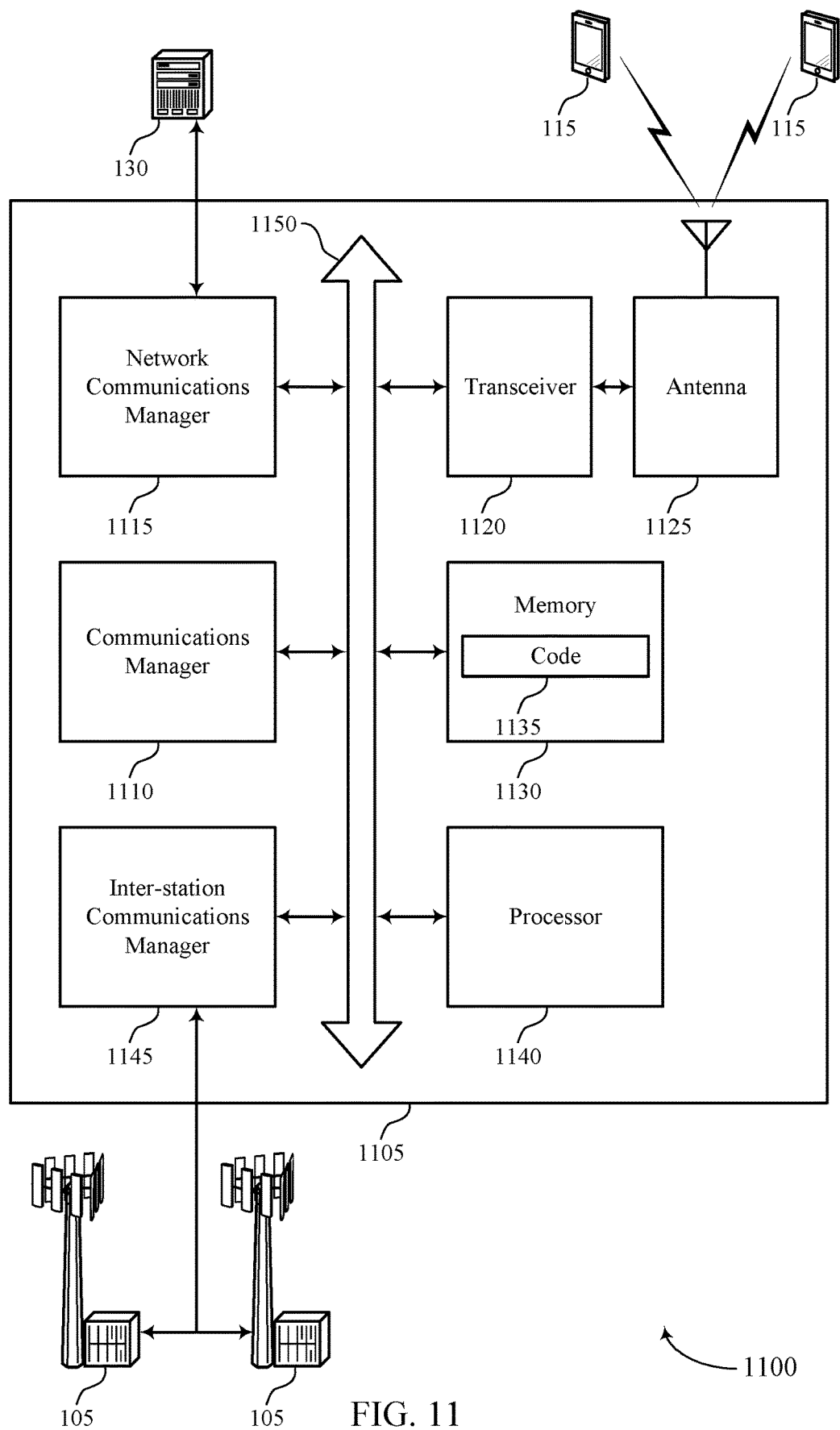
FIG. 11 shows a diagram of a system including a device that supports handover techniques to provide service continuity with multiple concurrent connections in accordance with aspects of the present disclosure.

FIG. 11 shows a diagram of a system 1100 including a device 1105 that supports handover techniques to provide service continuity with multiple concurrent connections in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station, initiate the handover procedure with the UE to handover the UE from the source base station to the target base station, and communicate with the UE during the handover procedure based on the priority information.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting handover techniques to provide service continuity with multiple concurrent connections).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
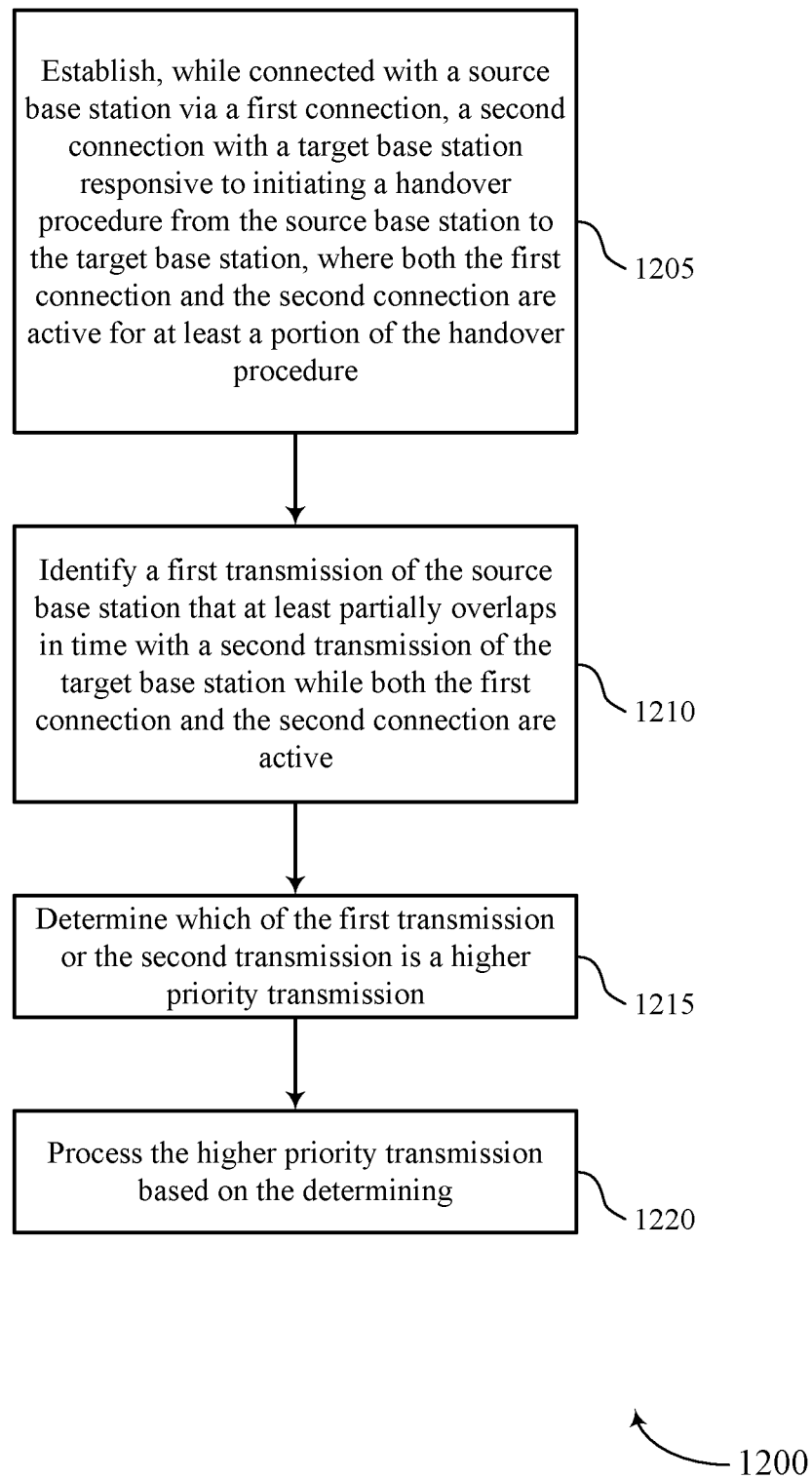
FIGS. 12 through 15 show flowcharts illustrating methods that support handover techniques to provide service continuity with multiple concurrent connections in accordance with aspects of the present disclosure.

FIG. 12 shows a flowchart illustrating a method 1200 that supports handover techniques to provide service continuity with multiple concurrent connections in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described. Additionally or alternatively, a UE may perform aspects of the functions described using special-purpose hardware.

At 1205, the UE may establish, while connected with a source base station via a first connection, a second connection with a target base station responsive to initiating a handover procedure from the source base station to the target base station, where both the first connection and the second connection are active for at least a portion of the handover procedure. The operations of 1205 may be performed according to the methods described herein. In some examples, aspects of the operations of 1205 may be performed by a connection establishment manager as described with reference to FIGS. 4 through 7.

At 1210, the UE may identify a first transmission of the source base station that at least partially overlaps in time with a second transmission of the target base station while both the first connection and the second connection are active. The operations of 1210 may be performed according to the methods described herein. In some examples, aspects of the operations of 1210 may be performed by a scheduling manager as described with reference to FIGS. 4 through 7.

At 1215, the UE may determine which of the first transmission or the second transmission is a higher priority transmission. The operations of 1215 may be performed according to the methods described herein. In some examples, aspects of the operations of 1215 may be performed by a priority manager as described with reference to FIGS. 4 through 7.

At 1220, the UE may process the higher priority transmission based on the determining. The operations of 1220 may be performed according to the methods described herein. In some examples, aspects of the operations of 1220 may be performed by a priority manager as described with reference to FIGS. 4 through 7.

Figure 13:
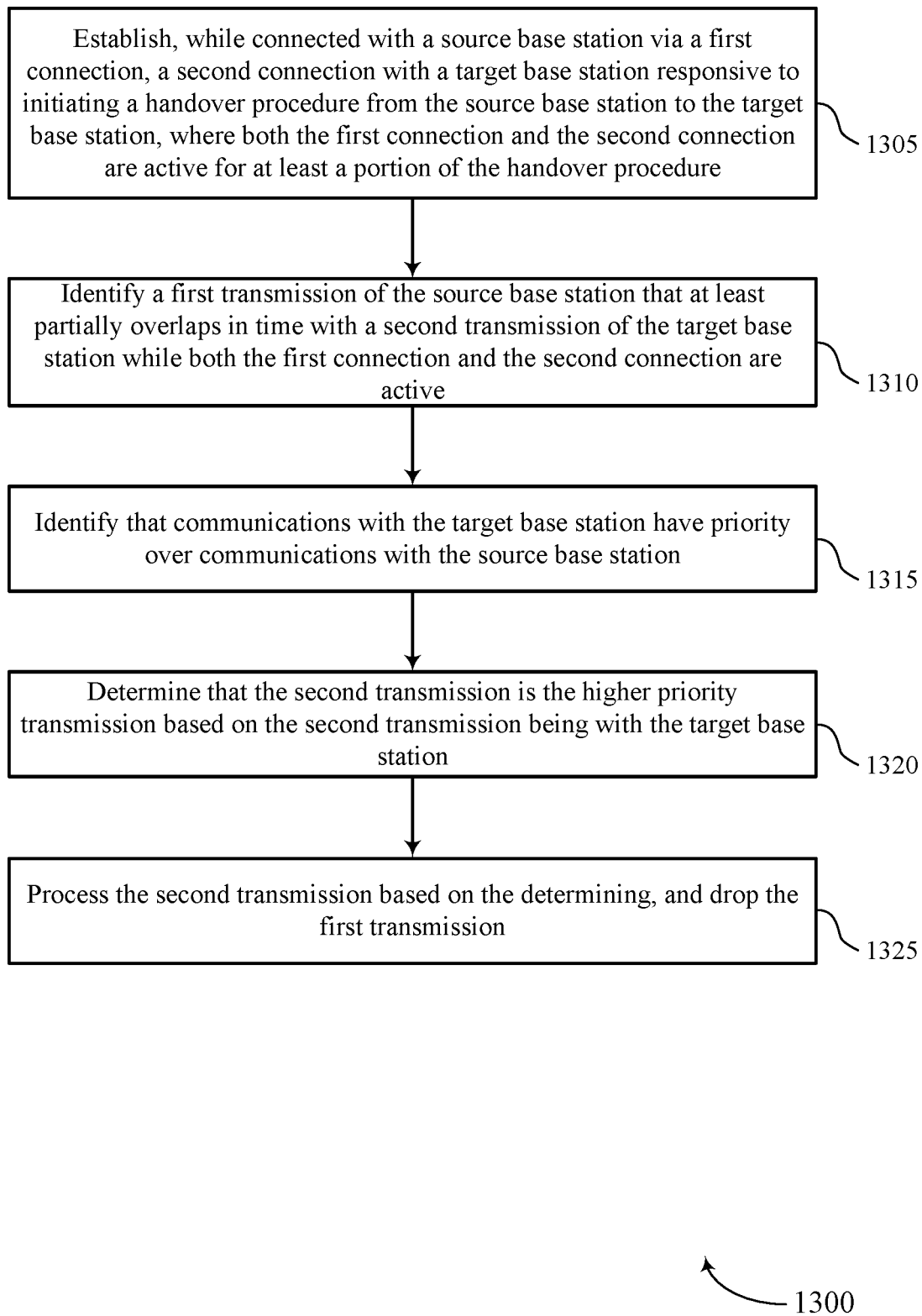

FIG. 13 shows a flowchart illustrating a method 1300 that supports handover techniques to provide service continuity with multiple concurrent connections in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described. Additionally or alternatively, a UE may perform aspects of the functions described using special-purpose hardware.

At 1305, the UE may establish, while connected with a source base station via a first connection, a second connection with a target base station responsive to initiating a handover procedure from the source base station to the target base station, where both the first connection and the second connection are active for at least a portion of the handover procedure. The operations of 1305 may be performed according to the methods described herein. In some examples, aspects of the operations of 1305 may be performed by a connection establishment manager as described with reference to FIGS. 4 through 7.

At 1310, the UE may identify a first transmission of the source base station that at least partially overlaps in time with a second transmission of the target base station while both the first connection and the second connection are active. The operations of 1310 may be performed according to the methods described herein. In some examples, aspects of the operations of 1310 may be performed by a scheduling manager as described with reference to FIGS. 4 through 7.

At 1315, the UE may identify that communications with the target base station have priority over communications with the source base station. The operations of 1315 may be performed according to the methods described herein. In some examples, aspects of the operations of 1315 may be performed by a priority manager as described with reference to FIGS. 4 through 7.

At 1320, the UE may determine that the second transmission is the higher priority transmission based on the second transmission being with the target base station. The operations of 1320 may be performed according to the methods described herein. In some examples, aspects of the operations of 1320 may be performed by a priority manager as described with reference to FIGS. 4 through 7.

At 1325, the UE may process the second transmission based on the determining, and drop the first transmission. The operations of 1325 may be performed according to the methods described herein. In some examples, aspects of the operations of 1325 may be performed by a priority manager as described with reference to FIGS. 4 through 7.

Figure 14:
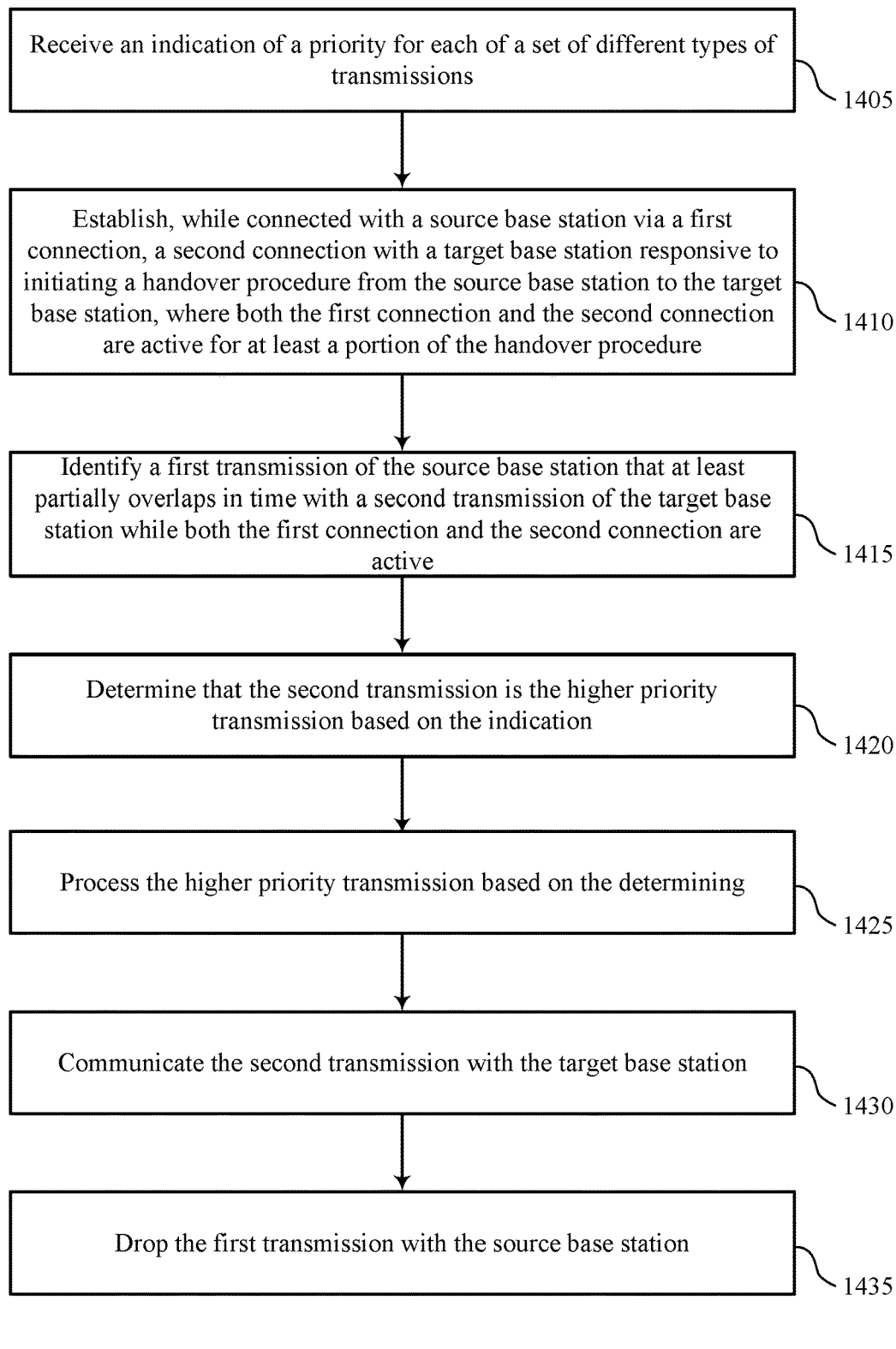

FIG. 14 shows a flowchart illustrating a method 1400 that supports handover techniques to provide service continuity with multiple concurrent connections in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described. Additionally or alternatively, a UE may perform aspects of the functions described using special-purpose hardware.

At 1405, the UE may receive an indication of a priority for each of a set of different types of transmissions. The operations of 1405 may be performed according to the methods described herein. In some examples, aspects of the operations of 1405 may be performed by a configuration manager as described with reference to FIGS. 4 through 7.

At 1410, the UE may establish, while connected with a source base station via a first connection, a second connection with a target base station responsive to initiating a handover procedure from the source base station to the target base station, where both the first connection and the second connection are active for at least a portion of the handover procedure. The operations of 1410 may be performed according to the methods described herein. In some examples, aspects of the operations of 1410 may be performed by a connection establishment manager as described with reference to FIGS. 4 through 7.

At 1415, the UE may identify a first transmission of the source base station that at least partially overlaps in time with a second transmission of the target base station while both the first connection and the second connection are active. The operations of 1415 may be performed according to the methods described herein. In some examples, aspects of the operations of 1415 may be performed by a scheduling manager as described with reference to FIGS. 4 through 7.

At 1420, the UE may determine that the second transmission is the higher priority transmission based on the indication. The operations of 1420 may be performed according to the methods described herein. In some examples, aspects of the operations of 1420 may be performed by a priority manager as described with reference to FIGS. 4 through 7.

At 1425, the UE may process the second transmission based on the determining. The operations of 1425 may be performed according to the methods described herein. In some examples, aspects of the operations of 1425 may be performed by a priority manager as described with reference to FIGS. 4 through 7.

At 1430, the UE may communicate the second transmission with the target base station. The operations of 1430 may be performed according to the methods described herein. In some examples, aspects of the operations of 1430 may be performed by a scheduling manager as described with reference to FIGS. 4 through 7.

At 1435, the UE may drop the first transmission with the source base station. The operations of 1435 may be performed according to the methods described herein. In some examples, aspects of the operations of 1435 may be performed by a scheduling manager as described with reference to FIGS. 4 through 7.

Figure 15:
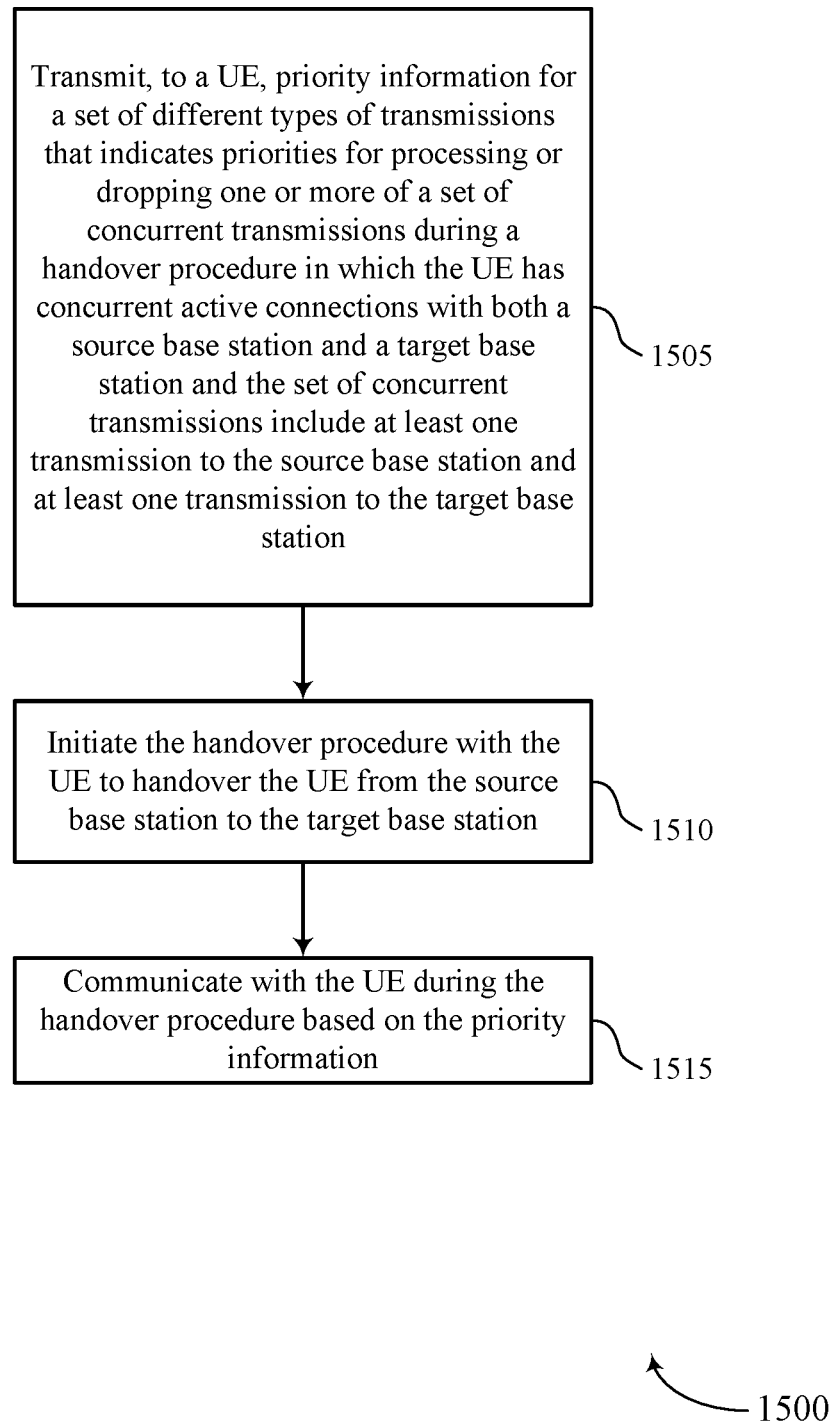

FIG. 15 shows a flowchart illustrating a method 1500 that supports handover techniques to provide service continuity with multiple concurrent connections in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described. Additionally or alternatively, a base station may perform aspects of the functions described using special-purpose hardware.

At 1505, the base station may transmit, to a UE, priority information for a set of different types of transmissions that indicates priorities for processing or dropping one or more of a set of concurrent transmissions during a handover procedure in which the UE has concurrent active connections with both a source base station and a target base station and the set of concurrent transmissions include at least one transmission to the source base station and at least one transmission to the target base station. The operations of 1505 may be performed according to the methods described herein. In some examples, aspects of the operations of 1505 may be performed by a configuration manager as described with reference to FIGS. 8 through 11.

At 1510, the base station may initiate the handover procedure with the UE to handover the UE from the source base station to the target base station. The operations of 1510 may be performed according to the methods described herein. In some examples, aspects of the operations of 1510 may be performed by a handover manager as described with reference to FIGS. 8 through 11.

At 1515, the base station may communicate with the UE during the handover procedure based on the priority information. The operations of 1515 may be performed according to the methods described herein. In some examples, aspects of the operations of 1515 may be performed by a scheduling manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: establishing, while connected with a source base station via a first connection, a second connection with a target base station responsive to initiating a handover procedure from the source base station to the target base station, wherein both the first connection and the second connection are active for at least a portion of the handover procedure; identifying a first transmission of the source base station that at least partially overlaps in time with a second transmission of the target base station while both the first connection and the second connection are active; determining which of the first transmission or the second transmission is a higher priority transmission; and processing the higher priority transmission based at least in part on the determining.

Aspect 2: The method of aspect 1, wherein the determining comprises: identifying that communications with the target base station have priority over communications with the source base station; and determining that the second transmission is the higher priority transmission based at least in part on the second transmission being with the target base station.

Aspect 3: The method of any of aspects 1 through 2, further comprising: receiving an indication of a priority for each of a plurality of different types of transmissions; and determining that the second transmission is the higher priority transmission based at least in part on the indication.

Aspect 4: The method of aspect 3, further comprising: communicating the second transmission with the target base station; and dropping the first transmission with the source base station.

Aspect 5: The method of any of aspects 3 through 4, further comprising: identifying that both the first transmission and the second transmission have a same priority; and identifying that communications with the target base station have priority over communications with the source base station.

Aspect 6: The method of any of aspects 3 through 5, wherein a first plurality of transmissions of the source base station are at least partially overlapping in time with a second plurality of transmissions of the target base station; the first plurality of transmissions includes the first transmission and the second plurality of transmissions includes the second transmission; and the determining that the second transmission is the higher priority transmission is based at least in part on the priority for each of the plurality of different types of transmissions applied to one or more of the first plurality of transmissions or the second plurality of transmissions.

Aspect 7: The method of aspect 6, wherein the priority for each of the plurality of different types of transmissions is applied separately to each of the first plurality of transmissions and the second plurality of transmissions, and the determining which of the first transmission or the second transmission is the higher priority transmission is based at least in part on one or more of the priority for each of the plurality of different types of transmissions, or which of the source base station or the target base station is associated with the transmission.

Aspect 8: The method of any of aspects 6 through 7, wherein the priority for each of the plurality of different types of transmissions is applied jointly across both of the first plurality of transmissions and the second plurality of transmissions, and the determining which of the first transmission or the second transmission is the higher priority transmission is based at least in part on one or more of the priority for each of the plurality of different types of transmissions, or which of the source base station or the target base station is associated with the transmission.

Aspect 9: The method of any of aspects 3 through 8, wherein the priority for each of the plurality of different types of transmissions is based at least in part on a channel type of an associated transmission.

Aspect 10: The method of aspect 9, wherein the priority for each of the plurality of different types of transmissions is received in one or more of radio resource control signaling, downlink control information, or any combinations thereof.

Aspect 11: The method of any of aspects 9 through 10, wherein the priority for each of the plurality of different types of transmissions is further based at least in part on whether the associated transmission is for the source base station or the target base station.

Aspect 12: The method of any of aspects 1 through 11, wherein the first transmission and the second transmission are uplink transmissions from the UE to the source base station or the target base station.

Aspect 13: The method of any of aspects 1 through 12, wherein the first transmission and the second transmission are downlink transmissions from the source base station or the target base station to the UE.

Aspect 14: A method for wireless communication at a base station, comprising: transmitting, to a UE, priority information for a plurality of different types of transmissions that indicates priorities for processing or dropping one or more of a plurality of concurrent transmissions during a handover procedure in which the UE has concurrent active connections with both a source base station and a target base station and the plurality of concurrent transmissions include at least one transmission to the source base station and at least one transmission to the target base station; initiating the handover procedure with the UE to handover the UE from the source base station to the target base station; and communicating with the UE during the handover procedure based at least in part on the priority information.

Aspect 15: The method of aspect 14, wherein the priority information indicates that communications with the target base station have priority over communications with the source base station.

Aspect 16: The method of aspect 15, wherein the priority information further indicates that, when transmission types have a same priority level, communications with the target base station have priority over communications with the source base station.

Aspect 17: The method of any of aspects 15 through 16, wherein the priority information is further applied by the UE when the plurality of concurrent transmissions include a first plurality of transmissions of the source base station, a second plurality of transmissions of the target base station, or combinations thereof.

Aspect 18: The method of aspect 17, wherein the priority information is applied separately to each of the first plurality of transmissions and the second plurality of transmissions, and the priority information indicates which of the source base station or the target base station has higher priority within each of the plurality of different types of transmissions.

Aspect 19: The method of any of aspects 17 through 18, wherein the priority information is applied jointly across both of the first plurality of transmissions and the second plurality of transmissions, and the priority information indicates which of the source base station or the target base station has higher priority within each of the plurality of different types of transmissions.

Aspect 20: The method of any of aspects 14 through 19, wherein the priority information is based at least in part on a channel type of the plurality of different types of transmissions.

Aspect 21: The method of aspect 20, wherein the priority information is transmitted to the UE in one or more of radio resource control signaling, downlink control information, or any combinations thereof.

Aspect 22: The method of any of aspects 14 through 21, wherein the plurality of concurrent transmissions are uplink transmissions from the UE to the source base station or the target base station.

Aspect 23: The method of any of aspects 14 through 22, wherein the plurality of concurrent transmissions are downlink transmissions from the source base station or the target base station to the UE.

Aspect 24: An apparatus for wireless communication at a UE, comprising a processor; memory coupled with the processor; and instructions stored in the memory and executable by the processor to cause the apparatus to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a base station, comprising a processor; memory coupled with the processor; and instructions stored in the memory and executable by the processor to cause the apparatus to perform a method of any of aspects 14 through 23.

Aspect 28: An apparatus for wireless communication at a base station, comprising at least one means for performing a method of any of aspects 14 through 23.

Aspect 29: A non-transitory computer-readable medium storing code for wireless communication at a base station, the code comprising instructions executable by a processor to perform a method of any of aspects 14 through 23.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing, while connected with a source access network entity via a first connection, a second connection with a target access network entity responsive to initiating a handover procedure from the source access network entity to the target access network entity, wherein both the first connection and the second connection are active for at least a portion of the handover procedure;
    identifying a first transmission of the source access network entity that at least partially overlaps in time with a second transmission of the target access network entity while both the first connection and the second connection are active;
    determining which of the first transmission or the second transmission is a higher priority transmission based at least in part on a type of the first transmission and a type of the second transmission; and
    processing the higher priority transmission according to a set of rules for determining which transmission to process based at least in part on a priority of the first transmission and a priority of the second transmission.

2. The method of claim 1, wherein the determining comprises:
    identifying that communications with the target access network entity have priority over communications with the source access network entity; and
    determining that the second transmission is the higher priority transmission based at least in part on the second transmission being with the target access network entity.

3. The method of claim 1, further comprising:
    receiving an indication of a priority for each of a plurality of different types of transmissions; and
    determining that the second transmission is the higher priority transmission based at least in part on the indication.

4. The method of claim 3, further comprising:
    communicating the second transmission with the target access network entity; and
    dropping the first transmission with the source access network entity.

5. The method of claim 3, further comprising:
    identifying that both the first transmission and the second transmission have a same priority; and
    identifying that communications with the target access network entity have priority over communications with the source access network entity.

6. The method of claim 3, wherein:
    a first plurality of transmissions of the source access network entity are at least partially overlapping in time with a second plurality of transmissions of the target access network entity;
    the first plurality of transmissions includes the first transmission and the second plurality of transmissions includes the second transmission; and
    the determining that the second transmission is the higher priority transmission is based at least in part on the priority for each of the plurality of different types of transmissions applied to one or more of the first plurality of transmissions or the second plurality of transmissions.

7. The method of claim 6, wherein the priority for each of the plurality of different types of transmissions is applied separately to each of the first plurality of transmissions and the second plurality of transmissions, and wherein the determining which of the first transmission or the second transmission is the higher priority transmission is based at least in part on one or more of the priority for each of the plurality of different types of transmissions, or which of the source access network entity or the target access network entity is associated with the first transmission and which of the source access network entity or the target access network entity is associated with the second transmission.

8. The method of claim 6, wherein the priority for each of the plurality of different types of transmissions is applied jointly across both of the first plurality of transmissions and the second plurality of transmissions, and wherein the determining which of the first transmission or the second transmission is the higher priority transmission is based at least in part on one or more of the priority for each of the plurality of different types of transmissions, or which of the source access network entity or the target access network entity is associated with the first transmission and which of the source access network entity or the target access network entity is associated with the second transmission.

9. The method of claim 3, wherein the priority for each of the plurality of different types of transmissions is based at least in part on a channel type of an associated transmission.

10. The method of claim 9, wherein the priority for each of the plurality of different types of transmissions is received in one or more of radio resource control signaling, downlink control information, or any combinations thereof.

11. The method of claim 9, wherein the priority for each of the plurality of different types of transmissions is further based at least in part on whether the associated transmission is for the source access network entity or the target access network entity.

12. The method of claim 1, wherein the first transmission and the second transmission are uplink transmissions from the UE to the source access network entity or the target access network entity.

13. The method of claim 1, wherein the first transmission and the second transmission are downlink transmissions from the source access network entity or the target access network entity to the UE.

14. A method for wireless communication at a access network entity, comprising:
   transmitting, to a user equipment (UE), priority information and a set of rules, the priority information indicating for each of a plurality of different types of transmissions a relative priority of the plurality of the different types of transmissions, wherein the set of rules indicates rules for processing or dropping one or more of a plurality of concurrent transmissions during a handover procedure in which the UE has concurrent active connections with both a source access network entity and a target access network entity and the plurality of concurrent transmissions include at least one transmission to the source access network entity and at least one transmission to the target access network entity based at least in part on the indicated relative priorities;
   initiating the handover procedure with the UE to handover the UE from the source access network entity to the target access network entity; and
   communicating with the UE during the handover procedure based at least in part on the priority information.

15. The method of claim 14, wherein the priority information indicates that communications with the target access network entity have priority over communications with the source access network entity.

16. The method of claim 15, wherein the priority information further indicates that, when transmission types have a same priority level, communications with the target access network entity have priority over communications with the source access network entity.

17. The method of claim 15, wherein the priority information is further applied by the UE when the plurality of concurrent transmissions include a first plurality of transmissions of the source access network entity, a second plurality of transmissions of the target access network entity, or combinations thereof.

18. The method of claim 17, wherein the priority information is applied separately to each of the first plurality of transmissions and the second plurality of transmissions, and wherein the priority information indicates which of the source access network entity or the target access network entity has higher priority within each of the plurality of different types of transmissions.

19. The method of claim 17, wherein the priority information is applied jointly across both of the first plurality of transmissions and the second plurality of transmissions, and wherein the priority information indicates which of the source access network entity or the target access network entity has higher priority within each of the plurality of different types of transmissions.

20. The method of claim 14, wherein the priority information is based at least in part on a channel type of the plurality of different types of transmissions.

21. The method of claim 20, wherein the priority information is transmitted to the UE in one or more of radio resource control signaling, downlink control information, or any combinations thereof.

22. The method of claim 14, wherein the plurality of concurrent transmissions are uplink transmissions from the UE to the source access network entity or the target access network entity.

23. The method of claim 14, wherein the plurality of concurrent transmissions are downlink transmissions from the source access network entity or the target access network entity to the UE.

24. An apparatus for wireless communication at a user equipment (UE), comprising:
   a processor,
   memory coupled with the processor; and
   instructions stored in the memory and executable by the processor to cause the apparatus to:
      establish, while connected with a source access network entity via a first connection, a second connection with a target access network entity responsive to initiating a handover procedure from the source access network entity to the target access network entity, wherein both the first connection and the second connection are active for at least a portion of the handover procedure;
      identify a first transmission of the source access network entity that at least partially overlaps in time with a second transmission of the target access network entity while both the first connection and the second connection are active;
      determine which of the first transmission or the second transmission is a higher priority transmission based at least in part on a type of the first transmission and a type of the second transmission; and
      process the higher priority transmission according to a set of rules for determining which transmission to process based at least in part on a priority of the first transmission and a priority of the second transmission.

25. The apparatus of claim 24, wherein the instructions to determine which of the first transmission or the second transmission is the higher priority transmission comprise instructions that are further executable by the processor to cause the apparatus to:
   identify that communications with the target access network entity have priority over communications with the source access network entity; and
   determine that the second transmission is the higher priority transmission based at least in part on the second transmission being with the target access network entity.

26. The apparatus of claim 24, wherein the instructions are further executable by the processor to cause the apparatus to:

receive, from the source access network entity, an indication of a priority for each of a plurality of different types of transmissions; and determine that the second transmission is the higher priority transmission based at least in part on the indication.

27. An apparatus for wireless communication at a access network entity, comprising:

a processor, memory coupled with the processor; and instructions stored in the memory and executable by the processor to cause the apparatus to:

transmit, to a user equipment (UE), priority information and a set of rules, the priority information indicating for each of a plurality of different types of transmissions a relative priority of the plurality of the different types of transmissions, wherein the set of rules indicates rules for processing or dropping one or more of a plurality of concurrent transmissions during a handover procedure in which the UE has concurrent active connections with both a source access network entity and a target access network entity and the plurality of concurrent transmissions include at least one transmission to the source access network entity and at least one transmission to the target access network entity based at least in part on the indicated relative priorities;

initiate the handover procedure with the UE to handover the UE from the source access network entity to the target access network entity; and communicate with the UE during the handover procedure based at least in part on the priority information.

28. The apparatus of claim 27, wherein the priority information indicates that communications with the target access network entity have priority over communications with the source access network entity.

29. The apparatus of claim 28, wherein the priority information further indicates that, when transmission types have a same priority level, communications with the target access network entity have priority over communications with the source access network entity.

30. The apparatus of claim 28, wherein the priority information is further applied by the UE when the plurality of concurrent transmissions include a first plurality of transmissions of the source access network entity, a second plurality of transmissions of the target access network entity, or combinations thereof.

* * * * *